(12) United States Patent
Chalk et al.

(10) Patent No.: US 12,229,274 B2
(45) Date of Patent: Feb. 18, 2025

(54) SYSTEMS AND METHODS FOR TRAINING SET OBFUSCATION UTILIZING AN INVERTED THREAT MODEL IN A ZERO-TRUST COMPUTING ENVIRONMENT

(71) Applicant: BeeKeeperAI, Inc., Austin, TX (US)

(72) Inventors: Mary Elizabeth Chalk, Austin, TX (US); Robert Derward Rogers, Oakland, CA (US); Alan Donald Czeszynski, Pleasanton, CA (US)

(73) Assignee: BeeKeeperAI, Inc., Austin, TX (US)

( * ) Notice: Subject to any disclaimer, the term of this patent is extended or adjusted under 35 U.S.C. 154(b) by 239 days.

(21) Appl. No.: 18/110,767

(22) Filed: Feb. 16, 2023

(65) Prior Publication Data

US 2024/0273233 A1   Aug. 15, 2024

Related U.S. Application Data

(63) Continuation of application No. 18/110,308, filed on Feb. 15, 2023.

(51) Int. Cl.
*G06F 21/57* (2013.01)
*G06F 21/62* (2013.01)
*G06N 20/00* (2019.01)

(52) U.S. Cl.
CPC ........ *G06F 21/577* (2013.01); *G06F 21/6245* (2013.01); *G06N 20/00* (2019.01); *G06F 2221/033* (2013.01)

(58) Field of Classification Search
CPC ............... G06F 21/577; G06F 21/6245; G06F 2221/033; G06N 20/00
See application file for complete search history.

(56) References Cited

U.S. PATENT DOCUMENTS 11,151,243 B1   10/2021   McNamara, Jr. et al.
11,470,100 B1   10/2022   Christian
(Continued)

FOREIGN PATENT DOCUMENTS

WO   WO2022/207515   10/2022

OTHER PUBLICATIONS

Alves, Tiago AO, Felipe MG França, and Sandip Kundu. "MLPrivacyGuard: Defeating confidence information based model inversion attacks on machine learning systems." Proceedings of the 2019 on Great Lakes Symposium on VLSI. 2019. (Year: 2019).*

(Continued)

*Primary Examiner* — Sangseok Park
(74) *Attorney, Agent, or Firm* — Daniel Maffeo

(57) ABSTRACT

An algorithm is trained on a dataset to facilitate dynamic data exfiltration protection in a zero-trust environment. An inversion threat model using the original training dataset (a 'gold standard' inversion model) may also be generated. This inversion model can be characterized to determine its performance/accuracy of properly identifying a given input as being within the original training dataset or not (a data exfiltration event). It is possible to reduce this risk of data exfiltration to a desired level, without unduly impacting the algorithm's performance using the inversion model for the generation of noise that is targeted (as opposed to Gaussian noise). Noise added to the original training dataset causes the inversion model to perform poorer (meaning data steward data is more secure) but has a corresponding impact on the algorithm accuracy and performance. By adding noise generated by the inversion model in an iterative manner, and measuring the inversion model's performance, a balance can be reached where the data steward's data is considered secure, while minimizing the negative impact on the algorithm performance.

18 Claims, 25 Drawing Sheets

(56) References Cited

U.S. PATENT DOCUMENTS

| | | |
|---|---|---|
| 2020/0311300 A1 | 10/2020 | Callcut et al. |
| 2022/0270725 A1 | 8/2022 | DeRosa-Grund |
| 2022/0337557 A1 | 10/2022 | Head et al. |
| 2024/0184885 A1* | 6/2024 | Langworthy .......... G06N 20/20 |

OTHER PUBLICATIONS

ISA/US, "Notification of Transmittal of the ISR and the Written Opinion of the International Searching Authority, or the Declaration," in PCT Application No. PCT/US2024/015435, Jun. 17, 2024, 15 pages.

Rahman et al., "A Deep Learning Assisted Software Defined Security Architecture for 6G Wireless Networks: IIoT Perspective"; Published in: IEEE Wireless Communications (vol. 29, Issue: 2, Apr. 2022); pp. 52-59; Date of Publication: Apr. 2022; retrieved on [Apr. 23, 2024]; retrieved from the internet <URL: https://ieeexplore.ieee.org/stamp/stamp.jsp?tp=&arnumber=9801721> entire document.

* cited by examiner

SYSTEMS AND METHODS FOR TRAINING SET OBFUSCATION UTILIZING AN INVERTED THREAT MODEL IN A ZERO-TRUST COMPUTING ENVIRONMENT

CROSS REFERENCE TO RELATED APPLICATIONS

This non-provisional application claims the benefit and priority of U.S. non-Provisional application Ser. No. 18/110,308, filed on Feb. 15, 2023, entitled "Systems And Methods For Measuring Data Exfiltration Vulnerability And Dynamic Differential Privacy In A Zero-Trust Computing Environment", which is incorporated herein in its entirety by this reference.

This application is related to an application being filed concurrently herewith, entitled "Systems And Methods For Model Overfitting Reduction Utilizing Data Subset Training In A Zero-Trust Computing Environment", U.S. non-Provisional Application Ser. No. 18/110,808, which application is incorporated herein in its entirety by this reference.

BACKGROUND

The present invention relates in general to the field of zero-trust computing, and more specifically to methods, computer programs and systems for data protection in a zero-trust environment. Such systems and methods are particularly useful in situations where algorithm developers wish to train their algorithms on data that is highly sensitive, such as protected health information. For avoidance of doubt, an algorithm may include a model, code, pseudocode, source code, or the like.

Within certain fields, there is a distinguishment between the developers of algorithms (often machine learning or artificial intelligence algorithms), and the stewards of the data that said algorithms are intended to operate with and be trained by. On its surface this seems to be an easily solved problem of merely sharing either the algorithm or the data that it is intended to operate with. However, in reality, there is often a strong need to keep the data and the algorithm secret. For example, the companies developing their algorithms may have the bulk of their intellectual property tied into the software comprising the algorithm. For many of these companies, their entire value may be centered around their proprietary algorithms. Sharing such sensitive data is a real risk to these companies, as the leakage of the software base code could eliminate their competitive advantage overnight.

One could imagine that instead, the data could be provided to the algorithm developer for running their proprietary algorithms and generation of the attendant reports. However, the problem with this methodology is two-fold. Firstly, often the datasets for processing and extremely large, requiring significant time to transfer the data from the data steward to the algorithm developer. Indeed, sometimes the datasets involved consume petabytes of data. The fastest fiber optics internet speed in the US is 2,000 MB/second. At this speed, transferring a petabyte of data can take nearly seven days to complete. It should be noted that most commercial internet speeds are a fraction of this maximum fiber optic speed.

The second reason that the datasets are not readily shared with the algorithm developers is that the data itself may be secret in some manner. For example, the data could also be proprietary, being of a significant asset value. Moreover, the data may be subject to some control or regulation. This is particularly true in the case of medical information. Protected health information, or PHI, for example, is subject to a myriad of laws, such as HIPAA, that include strict requirements on the sharing of PHI, and are subject to significant fines if such requirements are not adhered to.

Healthcare related information is of particular focus of this application. Of all the global stored data, about 30% resides in healthcare. This data provides a treasure trove of information for algorithm developers to train their specific algorithm models (AI or otherwise) and allows for the identification of correlations and associations within datasets. Such data processing allows advancements in the identification of individual pathologies, public health trends, treatment success metrics, and the like. Such output data from the running of these algorithms may be invaluable to individual clinicians, healthcare institutions, and private companies (such as pharmaceutical and biotechnology companies). At the same time, the adoption of clinical AI has been slow. More than 12,000 life-science papers described AI and ML in 2019 alone. Yet the U.S. Food and Drug Administration (FDA) has only approved only slightly more than 30 AI/ML-based medical technologies to date. Data access is a major barrier to clinical approval. The FDA requires proof that a model works across the entire population. However, privacy protections make it challenging to access enough diverse data to accomplish this goal.

If the issue of data privacy weren't already complex and fraught with potential pitfalls, there is additionally the possibility that models trained on the secret data may exfiltrate the data (either inadvertently or intentionally). Exfiltration of data is a significant concern for the data stewards, and many potential collaborations are avoided due to the (rightful) concerns by the data stewards that their proprietary and highly sensitive data may be compromised.

One manner that data may be exfiltrated includes the usage of an inversion attack. Essentially an inversion attack is the training of a model (an inversion model) which consumes the output classification vectors from a trained algorithm. The trained algorithm will have much higher confidence of a given input if said input was included in the training set (the data stewards' highly sensitive information). Inputs that were not part of any training set may be classified well but will generally have less precise classification vectors or may have classification vectors that exhibit specific patterns that can be detected by a machine learning classifier. An inversion model feeds the algorithm with a large volume of inputs, and uses the classification outputs to model for which inputs are likely to have been included in the training set. With sufficient input, and with a decently trained inversion model, a bad actor could conceivably regenerate a large number of the underlying training data.

In order to combat these inversion attacks, many times differential privacy is leveraged during the training of the algorithm. Differential privacy generally includes salting the dataset with Gaussian noise (or other noise inputs). The rationale is that such noise will confound any given inversion attack model, thereby rendering the training data secure. However, the degree of noise to be added to the training set is not always clear. Too little differential privacy will result in algorithms which are still highly susceptible to an inversion attack. Too much differential privacy may result in the degradation of the algorithm's performance. A balancing act needs to be employed, and functionally, most companies and individuals claiming to have protected the underlying data using differential privacy are still highly susceptible to an inversion attack.

It is therefore clear that there is a significant need for the protection of data from exfiltration by an inversion attack which accounts for the risk level of an exfiltration event and simultaneously protecting the trained algorithm from performance degradation. This allows for improved collaboration between data stewards and algorithm developers in a way that protects highly sensitive data, and yet ensuring the proper training of the algorithms.

SUMMARY

The present systems and methods relate to data exfiltration protection within a secure and zero-trust environment. Such systems and methods guarantee upper limits on the likelihood that data exfiltration could be performed by an inversion attack on a trained model. These tools enable data stewards to operate without concern of data breaches, potentially allowing broader partnerships between data stewards and a wider range of algorithm developers.

In some embodiments, an algorithm and a data set are received within the secure computing node. The algorithm is trained upon the dataset to generate a set of weights. An inversion model is also trained using these known training data and the classifications generated by the algorithm. The performance of the inversion model in reconstructing training data is characterized and compared against a threshold. When the performance is lower than the threshold, the weights for the trained algorithm may be output. However, when the inversion model is performing above the threshold, this indicates that the trained algorithm is susceptible to an inversion attack and that noise needs to be salted into the training data or other methods need to be employed to reduce the vulnerability of the model. For example, in some embodiments, a regularization technique could be applied during training to reduce the risk of model overfitting. The process may be repeated once a more secure training process has been performed.

The added noise may be Gaussian noise or may be more targeted (generated by the inversion model or only added to some sensitive data fields). The threshold for inversion model performance may be configured by a data steward or a regulator. In some cases, the threshold for inversion model performance is dictated by the sensitivity of the data it can accurately predict, or based upon the realistic speed in which an inversion model can make inferences (exfiltration upper limit) due to computational restrictions and/or input availability.

If after iterative noise addition the algorithm performance degrades too much for it to be useful, the system may switch over to a deployment method for data privacy instead. Here, rather than outputting the algorithm weights as trained with the requisite degree of noise to prevent an inversion attack, the algorithm is trained on unmodified training data. The algorithm is then used in a deployment model that provides a single classification output and a relative confidence level (as opposed to a classification vector).

It is also possible to aggregate and sub-divide the training data from multiple data stewards to further reduce the risk of model overfitting, and also to protect against inversion attacks. Iterative subdivision of the training superset into subsets and then generating a plurality of weakly trained algorithms is possible. These weak algorithms may then be aggregated into a strong algorithm. The same inversion attack vulnerability analysis may then be performed for different subsets in order to determine which subset combination yields a robust final algorithm that is also resistant to an inversion attack.

In sum, systems and methods for data exfiltration prevention through dynamic model privacy injection is provided. In some embodiments, an algorithm and a data set are received within the secure computing node. The algorithm is trained upon the dataset to generate a set of weights. An inversion model is also trained using these known training data and the classifications generated by the algorithm. The performance of the inversion model is characterized and compared against a threshold. When the performance is lower than the threshold, the weights for the trained algorithm may be output. Otherwise, it indicates that the trained algorithm is susceptible to an inversion attack and that noise needs to be salted into the training data. The process may be repeated once the training data is salted with noise.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The present invention relates to systems and methods for the zero-trust application on one or more algorithms processing sensitive datasets. Such systems and methods may be applied to any given dataset, but may have particular utility within the healthcare setting, where the data is extremely sensitive. As such, the following descriptions will center on healthcare use cases. This particular focus, however, should not artificially limit the scope of the invention. For example, the information processed may include sensitive industry information, financial, payroll or other personally identifiable information, or the like. As such, while much of the disclosure will refer to protected health information (PHI) it should be understood that this may actually refer to any sensitive type of data. Likewise, while the data stewards are generally thought to be a hospital or other healthcare entity, these data stewards may in reality be any entity that has and wishes to process their data within a zero-trust environment.

In some embodiments, the following disclosure will focus upon the term "algorithm". It should be understood that an algorithm may include machine learning (ML) models, neural network models, or other artificial intelligence (AI) models. However, algorithms may also apply to more mundane model types, such as linear models, least mean squares, or any other mathematical functions that convert one or more input values, and results in one or more output models.

Also, in some embodiments of the disclosure, the terms "node", "infrastructure" and "enclave" may be utilized. These terms are intended to be used interchangeably and indicate a computing architecture that is logically distinct (and often physically isolated). In no way does the utilization of one such term limit the scope of the disclosure, and these terms should be read interchangeably.

Figure 1A:
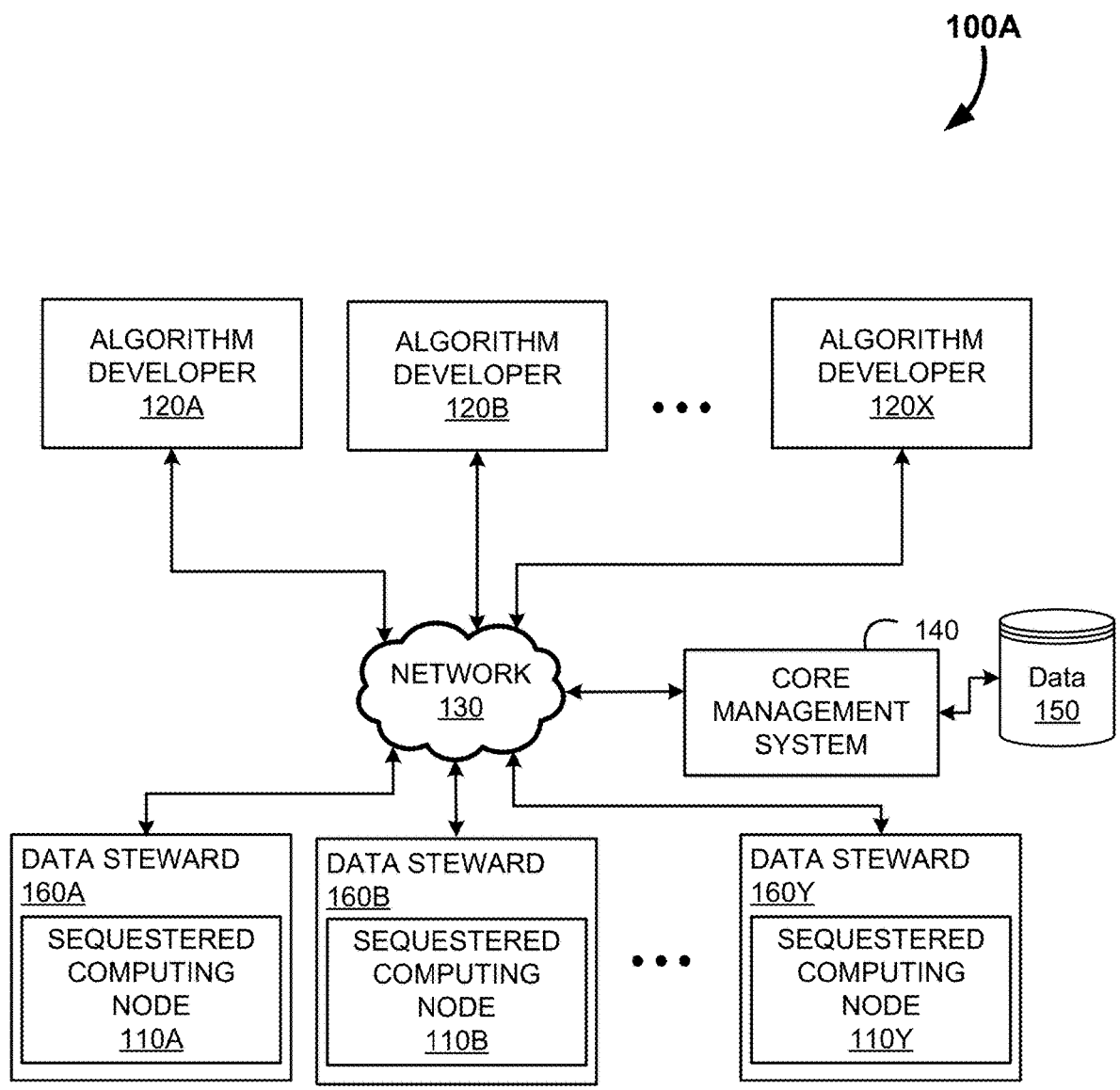
FIGS. 1A and 1B are example block diagrams of a system for zero trust computing of data by an algorithm, in accordance with some embodiment.

To facilitate discussions, FIG. 1A is an example of a zero-trust infrastructure, shown generally at 100a. This infrastructure includes one or more algorithm developers 120a-x which generate one or more algorithms for processing of data, which in this case is held by one or more data stewards 160a-y. The algorithm developers are generally companies that specialize in data analysis and are often highly specialized in the types of data that are applicable to their given models/algorithms. However, sometimes the algorithm developers may be individuals, universities, government agencies, or the like. By uncovering powerful insights in vast amounts of information, AI and machine learning (ML) can improve care, increase efficiency, and reduce costs. For example, AI analysis of chest x-rays predicted the progression of critical illness in COVID-19. In another example, an image-based deep learning model developed at MIT can predict breast cancer up to five years in advance. And yet another example is an algorithm developed at University of California San Francisco, which can detect pneumothorax (collapsed lung) from CT scans, helping prioritize and treat patients with this life-threatening condition—the first algorithm embedded in a medical device to achieve FDA approval.

Likewise, the data stewards may include public and private hospitals, companies, universities, governmental agencies, or the like. Indeed, virtually any entity with access to sensitive data that is to be analyzed may be a data steward.

The generated algorithms are encrypted at the algorithm developer in whole, or in part, before transmitting to the data stewards, in this example ecosystem. The algorithms are transferred via a core management system 140, which may supplement or transform the data using a localized datastore 150. The core management system also handles routing and deployment of the algorithms. The datastore may also be leveraged for key management in some embodiments that will be discussed in greater detail below.

Each of the algorithm developer 120a-x, and the data stewards 160a-y and the core management system 140 may be coupled together by a network 130. In most cases the network is comprised of a cellular network and/or the internet. However, it is envisioned that the network includes any wide area network (WAN) architecture, including private WAN's, or private local area networks (LANs) in conjunction with private or public WANs.

In this particular system, the data stewards maintain sequestered computing nodes 110a-y which function to actually perform the computation of the algorithm on the dataset. The sequestered computing nodes, or "enclaves", may be physically separate computer server systems, or may encompass virtual machines operating within a greater network of the data steward's systems. The sequestered computing nodes should be thought of as a vault. The encrypted algorithm and encrypted datasets are supplied to the vault, which is then sealed. Encryption keys 390 unique to the vault are then provided, which allows the decryption of the data and models to occur. No party has access to the vault at this time, and the algorithm is able to securely operate on the data. The data and algorithms may then be destroyed, or maintained as encrypted, when the vault is "opened" in order to access the report/output derived from the application of the algorithm on the dataset. Due to the specific sequestered computing node being required to decrypt the given algorithm(s) and data, there is no way they can be intercepted and decrypted. This system relies upon public-private key techniques, where the algorithm developer utilizes the public key 390 for encryption of the algorithm, and the sequestered computing node includes the private key in order to perform the decryption. In some embodiments, the private key may be hardware (in the case of Azure, for example) or software linked (in the case of AWS, for example).

In some particular embodiments, the system sends algorithm models via an Azure Confidential Computing environment to two data steward environments. Upon verification, the model and the data entered the Intel SGX sequestered enclave where the model is able to be validated against the protected information, for example PHI, data sets. Throughout the process, the algorithm owner cannot see the data, the data steward cannot see the algorithm model, and the management core can see neither the data nor the model.

The data steward uploads encrypted data to their cloud environment using an encrypted connection that terminates inside an Intel SGX-sequestered enclave. Then, the algorithm developer submits an encrypted, containerized AI model which also terminates into an Intel SGX-sequestered enclave. A key management system in the management core enables the containers to authenticate and then run the model on the data within the enclave. The data steward never sees the algorithm inside the container and the data is never visible to the algorithm developer. Neither component leaves the enclave. After the model runs, the developer receives a performance report on the values of the algorithm's performance (as will be discussed in considerable detail below). Finally, the algorithm owner may request that an encrypted artifact containing information about validation results is stored for regulatory compliance purposes and the data and the algorithm are wiped from the system.

Figure 1B:
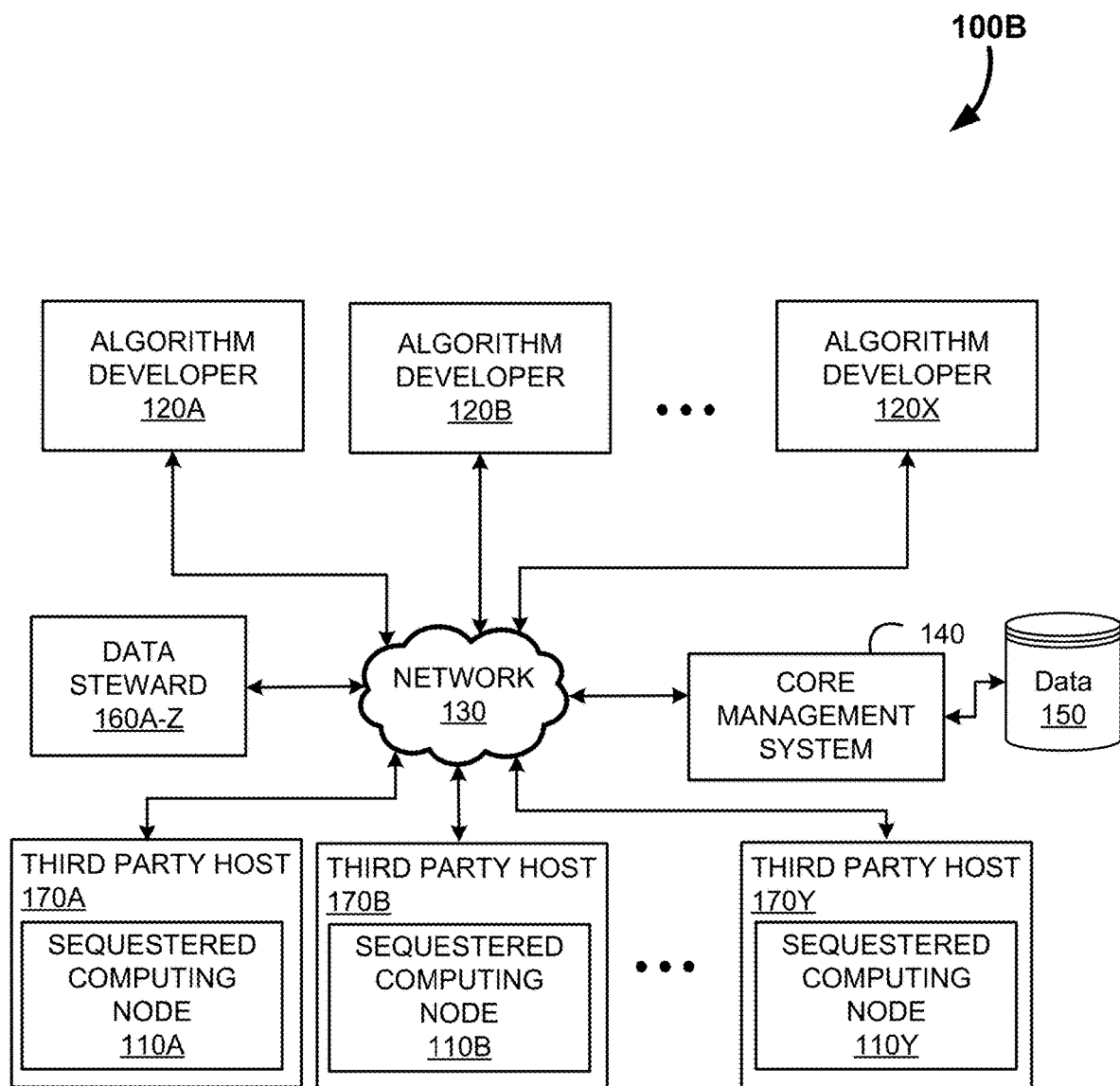

FIG. 1B provides a similar ecosystem 100b. This ecosystem also includes one or more algorithm developers 120a-x, which generate, encrypt and output their models. The core management system 140 receives these encrypted payloads, and in some embodiments, transforms or augments unencrypted portions of the payloads. The major difference between this substantiation and the prior figure, is that the sequestered computing node(s) 110a-y are present within a third-party host 170a-y. An example of a third-party host may include an offsite server such as Amazon Web Service (AWS) or similar cloud infrastructure. In such situations, the data steward encrypts their dataset(s) and provides them, via the network, to the third party hosted sequestered computing node(s) 110a-y. The output of the algorithm running on the dataset is then transferred from the sequestered computing node in the third-party, back via the network to the data steward (or potentially some other recipient).

In some specific embodiments, the system relies on a unique combination of software and hardware available through Azure Confidential Computing. The solution uses virtual machines (VMs) running on specialized Intel processors with Intel Software Guard Extension (SGX), in this embodiment, running in the third-party system. Intel SGX creates sequestered portions of the hardware's processor and memory known as "enclaves" making it impossible to view data or code inside the enclave. Software within the management core handles encryption, key management, and workflows.

In some embodiments, the system may be some hybrid between FIGS. 1A and 1B. For example, some datasets may be processed at local sequestered computing nodes, especially extremely large datasets, and others may be processed at third parties. Such systems provide flexibility based upon computational infrastructure, while still ensuring all data and algorithms remain sequestered and not visible except to their respective owners.

Figure 2:
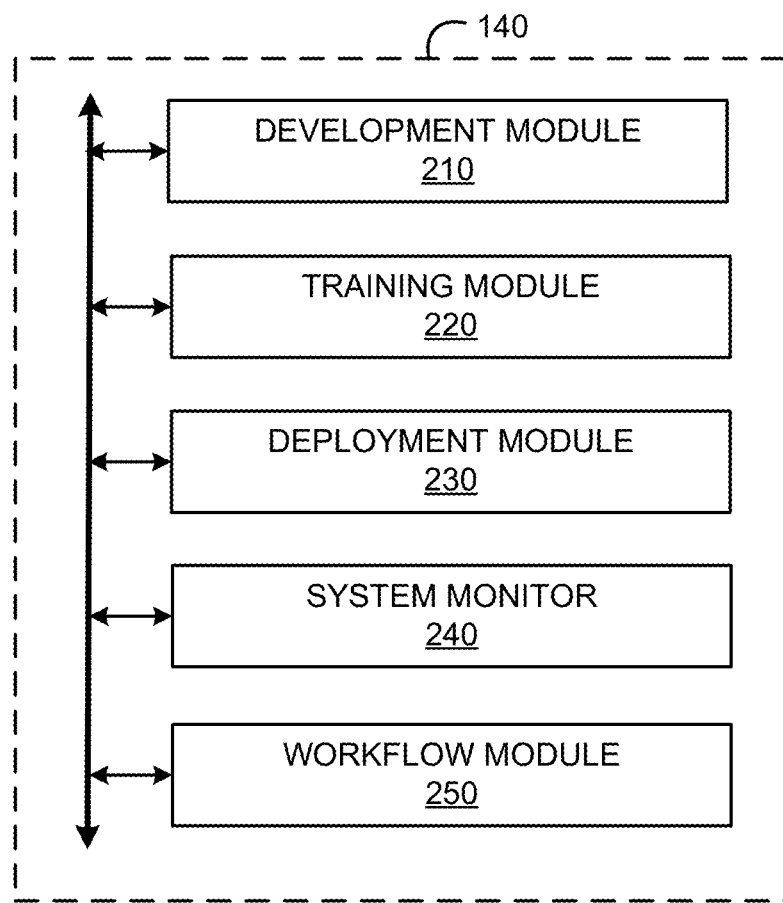
FIG. 2 is an example block diagram showing the core management system, in accordance with some embodiment.

Turning now to FIG. 2, greater detail is provided regarding the core management system 140. The core management system 140 may include a data science development module 210, a data harmonizer workflow creation module 250, a software deployment module 230, a federated master algorithm training module 220, a system monitoring module 240, and a data store comprising global join data 240.

The data science development module 210 may be configured to receive input data requirements from the one or more algorithm developers for the optimization and/or validation of the one or more models. The input data requirements define the objective for data curation, data transformation, and data harmonization workflows. The input data requirements also provide constraints for identifying data assets acceptable for use with the one or more models. The data harmonizer workflow creation module 250 may be configured to manage transformation, harmonization, and annotation protocol development and deployment. The software deployment module 230 may be configured along with the data science development module 210 and the data harmonizer workflow creation module 250 to assess data assets for use with one or more models. This process can be automated or can be an interactive search/query process. The software deployment module 230 may be further configured along with the data science development module 210 to integrate the models into a sequestered capsule computing framework, along with required libraries and resources.

In some embodiments, it is desired to develop a robust, superior algorithm/model that has learned from multiple disjoint private data sets (e.g., clinical and health data) collected by data hosts from sources (e.g., patients). The federated master algorithm training module may be configured to aggregate the learning from the disjoint data sets into a single master algorithm. In different embodiments, the algorithmic methodology for the federated training may be different. For example, sharing of model parameters, ensemble learning, parent-teacher learning on shared data and many other methods may be developed to allow for federated training. The privacy and security requirements, along with commercial considerations such as the determination of how much each data system might be paid for access to data, may determine which federated training methodology is used.

The system monitoring module 240 monitors activity in sequestered computing nodes. Monitored activity can range from operational tracking such as computing workload, error state, and connection status as examples to data science monitoring such as amount of data processed, algorithm convergence status, variations in data characteristics, data errors, algorithm/model performance metrics, and a host of additional metrics, as required by each use case and embodiment.

In some instances, it is desirable to augment private data sets with additional data located at the core management system (join data 150). For example, geolocation air quality data could be joined with geolocation data of patients to ascertain environmental exposures. In certain instances, join data may be transmitted to sequestered computing nodes to be joined with their proprietary datasets during data harmonization or computation.

The sequestered computing nodes may include a harmonizer workflow module, harmonized data, a runtime server, a system monitoring module, and a data management module (not shown). The transformation, harmonization, and annotation workflows managed by the data harmonizer workflow creation module may be deployed by and performed in the environment by harmonizer workflow module using transformations and harmonized data. In some instances, the join data may be transmitted to the harmonizer workflow module to be joined with data during data harmonization. The runtime server may be configured to run the private data sets through the algorithm/model.

The system monitoring module monitors activity in the sequestered computing node. Monitored activity may include operational tracking such as algorithm/model intake, workflow configuration, and data host onboarding, as required by each use case and embodiment. The data management module may be configured to import data assets such as private data sets while maintaining the data assets within the pre-exiting infrastructure of the data stewards.

Figure 3:
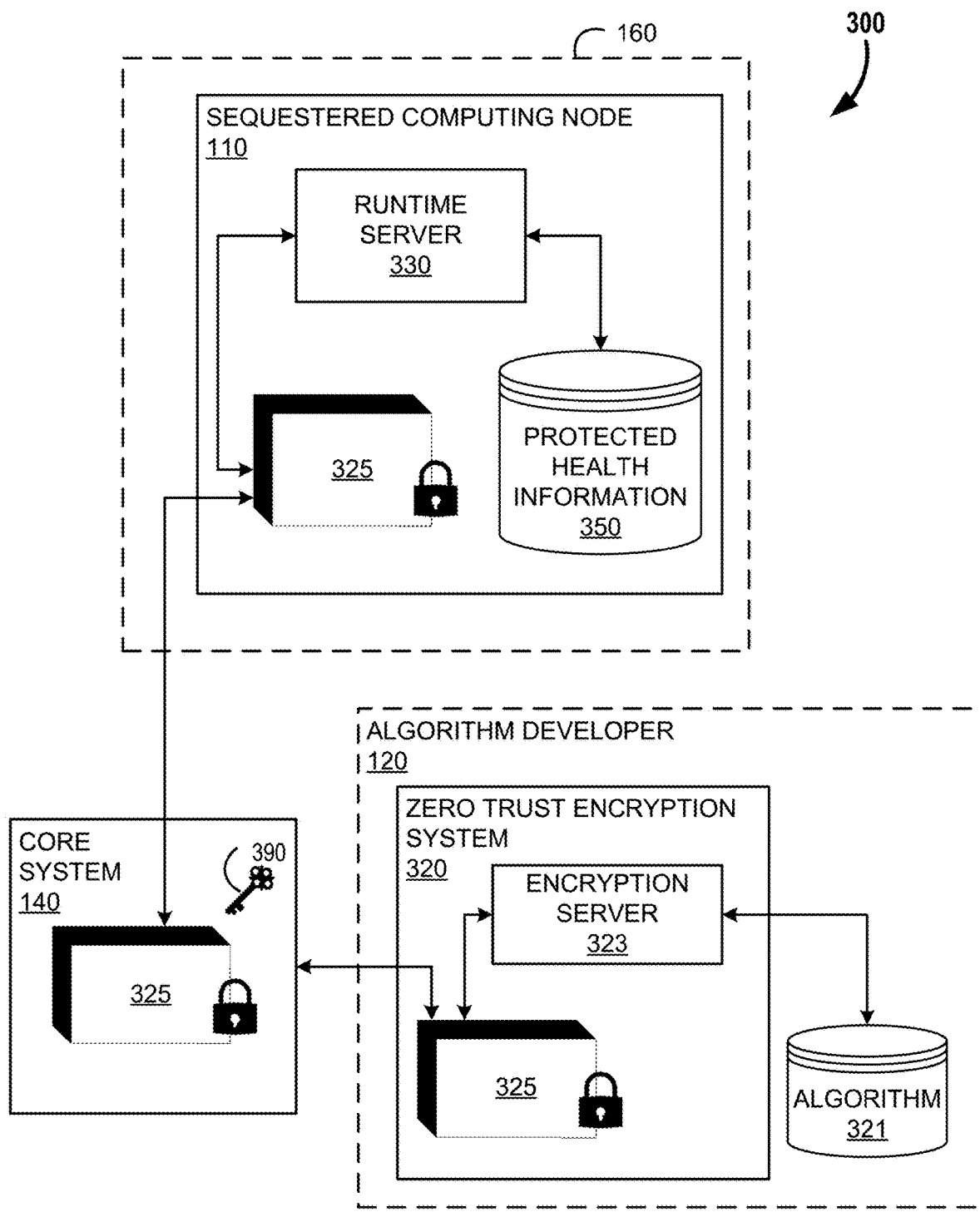
FIG. 3 is an example block diagram showing a first model for the zero-trust data flow, in accordance with some embodiment.

Turning now to FIG. 3, a first model of the flow of algorithms and data are provided, generally at 300. The Zero-Trust Encryption System 320 manages the encryption, by an encryption server 323, of all the algorithm developer's 120 software assets 321 in such a way as to prevent exposure of intellectual property (including source or object code) to any outside party, including the entity running the core management system 140 and any affiliates, during storage, transmission and runtime of said encrypted algorithms 325. In this embodiment, the algorithm developer is responsible for encrypting the entire payload 325 of the software using its own encryption keys. Decryption is only ever allowed at runtime in a sequestered capsule computing environment 110.

The core management system 140 receives the encrypted computing assets (algorithms) 325 from the algorithm developer 120. Decryption keys to these assets are not made available to the core management system 140 so that sensitive materials are never visible to it. The core management system 140 distributes these assets 325 to a multitude of data steward nodes 160 where they can be processed further, in combination with private datasets, such as protected health information (PHI) 350.

Each Data Steward Node 160 maintains a sequestered computing node 110 that is responsible for allowing the algorithm developer's encrypted software assets 325 (the "algorithm" or "algo") to compute on a local private dataset 350 that is initially encrypted. Within data steward node 160, one or more local private datasets (not illustrated) is harmonized, transformed, and/or annotated and then this dataset is encrypted by the data steward, into a local dataset 350, for use inside the sequestered computing node 110.

The sequestered computing node 110 receives the encrypted software assets 325 and encrypted data steward dataset(s) 350 and manages their decryption in a way that prevents visibility to any data or code at runtime at the runtime server 330. In different embodiments this can be performed using a variety of secure computing enclave technologies, including but not limited to hardware-based and software-based isolation.

In this present embodiment, the entire algorithm developer software asset payload 325 is encrypted in a way that it can only be decrypted in an approved sequestered computing enclave/node 110. This approach works for sequestered enclave technologies that do not require modification of source code or runtime environments in order to secure the computing space (e.g., software-based secure computing enclaves).

Figure 4:
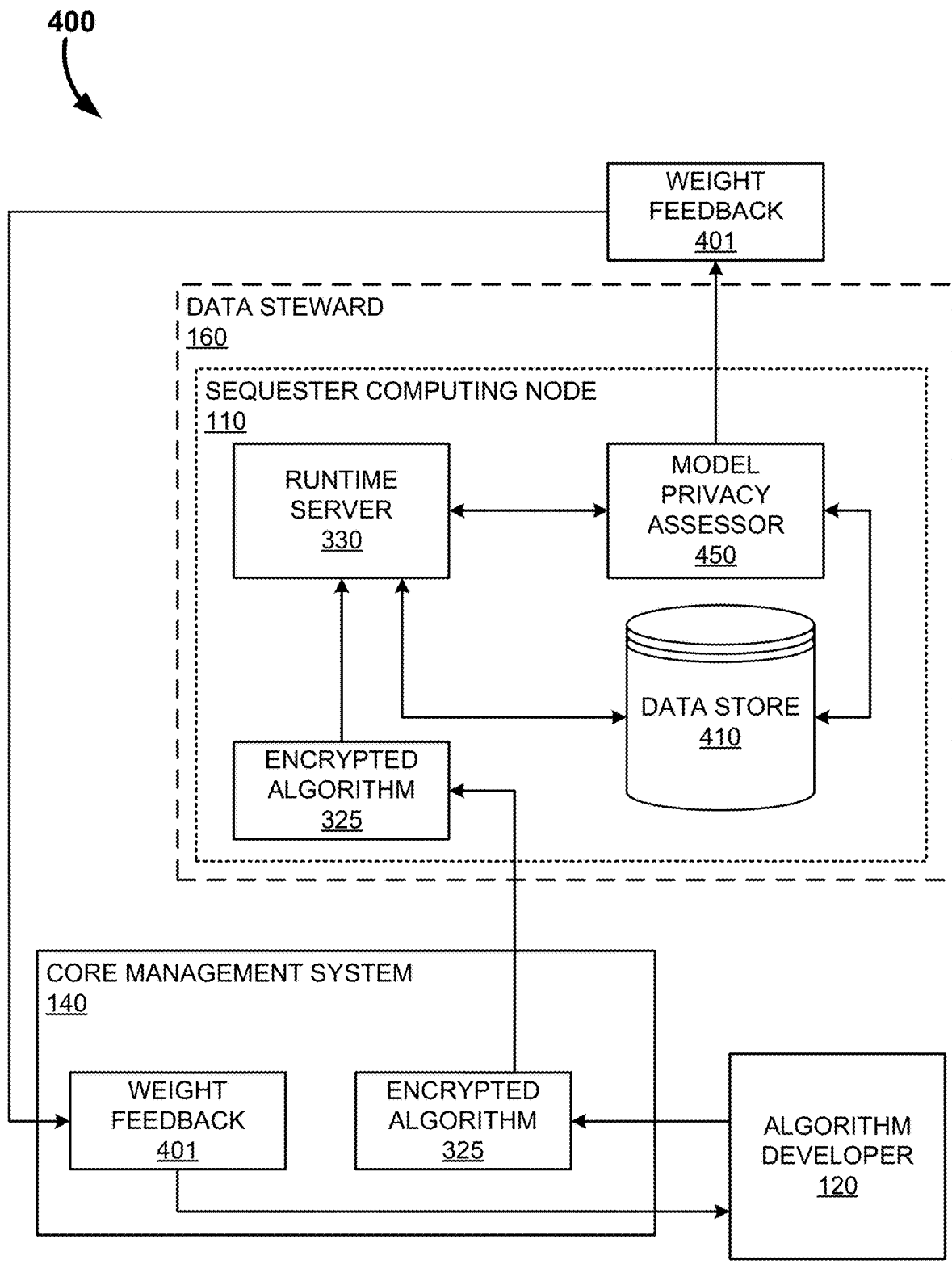
FIG. 4 is an example block diagram showing a model for the zero-trust data flow with data exfiltration analysis, in accordance with some embodiment.

Turning to FIG. 4, the general environment is maintained, as seen generally at 400, however in this embodiment the flow of trained model outputs (often model weights) is illustrated in greater detail. In this example diagram, the Algorithm developer 120 generates an algorithm, which is then encrypted and provided as an encrypted algorithm payload 325 to the core management system 140. As discussed previously, the core management system 140 is incapable of decrypting the encrypted algorithm 325. Rather, the core management system 140 controls the routing of the encrypted algorithm 325 and the management of keys. The encrypted algorithm 325 is then provided to the data steward 160 which is then "placed" in the sequestered computing node 110. The data steward 160 is likewise unable to decrypt the encrypted algorithm 325 unless and until it is located within the sequestered computing node 110, in which case the data steward still lacks the ability to access the "inside" of the sequestered computing node 110. As such, the algorithm is never accessible to any entity outside of the algorithm developer.

Likewise, the data steward 160 has access to protected health information and/or other sensitive information. The data steward 160 never transfers this data outside of its ecosystem, thus ensuring that the data is always inaccessible by any other party. The sensitive data may be encrypted (or remain in the clear) as it is also transferred into the sequestered computing node 110. This data store 410 is made accessible to the runtime server 330 also located "inside" the sequestered computing node 110. The runtime server 330 decrypts the encrypted algorithm 325 to yield the underlying algorithm model. This algorithm may then use the data store 410 to generate inferences regarding the data contained in the data store 410 (not illustrated). These inferences have value for the data steward 110, and may be outputted to the data steward for consumption.

The runtime server 330 may also perform a number of other operations. One critical function of the runtime server is to train the encrypted algorithms. Training the algorithm on the data generates a series of numerical weights. These weights may be feature vectors, integer values, or may take other forms. The weights, when output as feedback 401, may be provided from the core management system 140 back to the algorithm developer 120 for refining their model. Unfortunately, there are ways to attack a trained model in a manner that extrapolates backwards from the weight outputs the original data that was used to train the model (e.g., the private data from the data store 410). These kinds of attacks utilize "inversion models" that are trained on the algorithm's classifications of inputs and makes inferences based upon the classification on which inputs are actually training inputs. This generally involves feeding a trained algorithm many thousands to millions of inputs, receiving the resulting classifications, and then training a new AI model (the 'inversion model') to identify which of these inputs were also training inputs. Such "inversion attacks" are known in the art.

This allows for the exfiltration of the data steward's 160 sensitive data by an external bad actor. This is a significant concern to the data steward 160, and as such the system includes a model privacy assessor 450 which consumes the trained model and data from the data steward 160 in order to analyze the trained model for exfiltration susceptibility, enable exfiltration resistant training feedback, and ultimately the output of model feedback to the algorithm developer 120 for model refinement (in the form of inversion attack resistant weights 401, or as a deployable model that does not provide a classification vector).

Figure 5A:
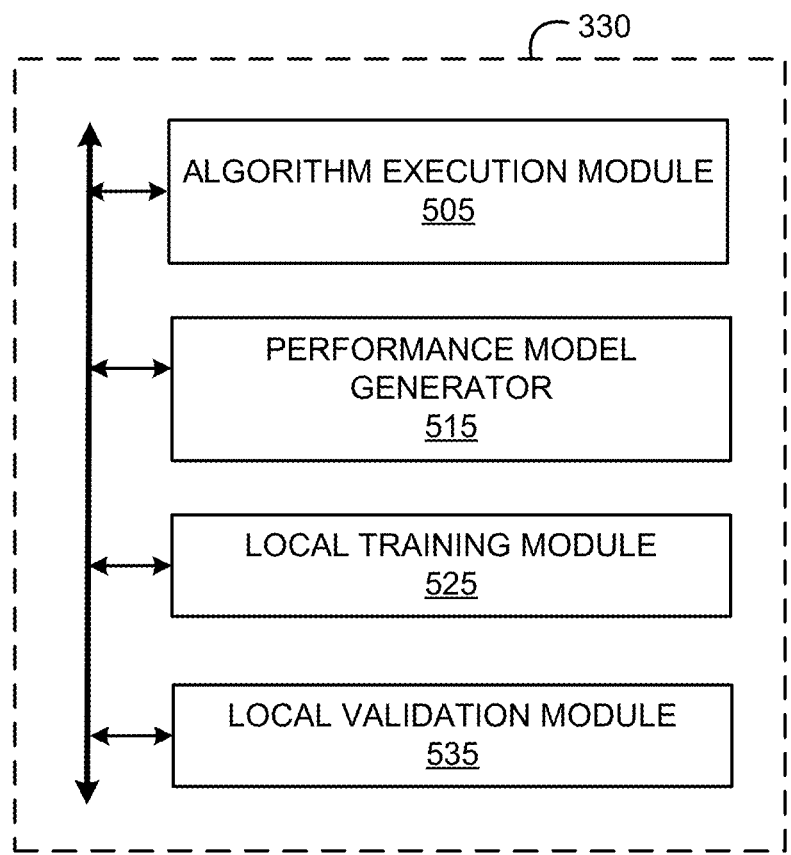
FIG. 5A is an example block diagram showing a runtime server, in accordance with some embodiment.

FIG. 5A provides a more detailed illustration of the functional components of the runtime server 330. An algorithm execution module 510 performs the actual processing of the PHI 411 using the algorithm 325. The result of this execution includes the generation of discrete inferences.

The runtime server 330 may include a performance model generator 520 which receives outputs from the algorithm execution module 510 and generates a performance model 401 using a recursion methodology.

In some embodiments, the runtime server 330 may additionally execute a master algorithm, and tune/train the algorithm locally at a local training module 530. Such localized training is known, however, in the present system, the local training module 530 may further be configured to take the locally tuned model and then reoptimize the master. The new reoptimized master may, in a reliable manner, be retuned to achieve performance that is better than the prior model's performance, yet staying consistent with the prior model. This consistency includes relative weighting of particular datapoints to ensure consistency in the models for these key elements while at the same time improving performance of the model generally. As detailed before, this training process, while necessary for the generation of effective models, is a potential vulnerability for the exfiltration of sensitive data.

In some embodiments, the confirmation that a retuned model is performing better than the prior version is determined by a local validation module 540. The local validation module 540 may include a mechanical test whereby the algorithm is deployed with a model specific validation methodology that is capable of determining that the algorithm performance has not deteriorated after a re-optimization. In some embodiments, the tuning may be performed on different data splits, and these splits are used to define a redeployment method. It should be noted that increasing the number (N) of samplings used for optimization not only improves the model's performance, but also reduces the size of the confidence interval.

Figure 5B:
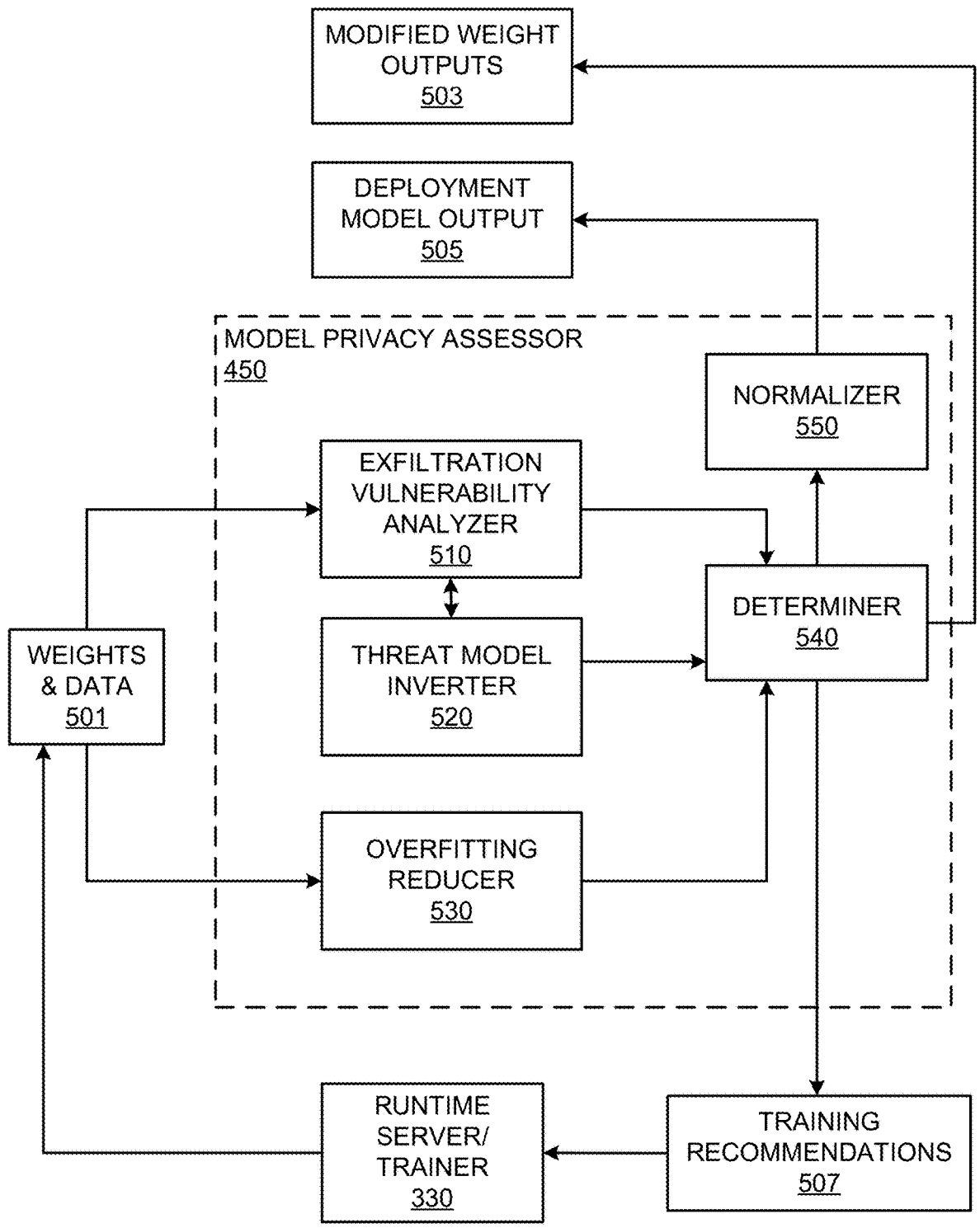
FIG. 5B is an example block diagram showing a model privacy assessor, in accordance with some embodiment.

FIG. 5B provides a more detailed illustration of the model privacy assessor 450. This system consumes the weights from the trained model (and the model performance data), the data from the data steward (collectively 501). The model privacy assessor 450 then performs two discrete actions on the weights. The first is to divide the dataset of the data steward into discrete subsets and reroutes the subsets to the determiner 540 as a set of training recommendations 507. The runtime server 330 may retrain the model on these recommended subsets, to generate a series of 'weak' models. These weak models may then be recombined into a 'strong' model and the weights of this new model may be reprocessed by the model privacy assessor 450. The result of sub-dividing the training dataset and then recombining the resulting weights is that it can 1) produce a final weight set that is more resistant to an inversion attack, and 2) it can reduce the overfitting of the final model. The role of the overfitting reducer 530 is to determine data subsets that achieve these goals in the most efficient manner. This may include randomly generating the subsets and reprocessing in this manner until a subset breakdown that maximizes these goals (or at least achieves a threshold acceptance level for one or both the goals) is achieved. In other embodiments, rather than pure randomized generation of the subsets, active learning techniques may be employed to generate the model subsets. In yet other embodiments, the system could subdivide the training data in one manner, then another manner, and yet another manner, etc. All these different subsets may then be trained, and all recombined.

The second main workflow for the model privacy assessor 450 is to determine the vulnerability of the trained model to exfiltration via an inversion attack and the generation of different outputs according to this vulnerability. An exfiltration vulnerability analyzer 510 is the core component of this process. A threat model inverter 520 couples to the exfiltration vulnerability analyzer 510. The threat model inverter 520 generate a 'gold standard' threat model (inversion model/inversion attack). This is considered a 'gold standard' inversion model because it has the underlying training data available to it, so it 'knows' what classification vectors from the algorithm actually apply to a piece of the training dataset. This is a critical point: all of the key elements (training data, classification vectors, etc.) are available within the enclave and can be computed upon without human intervention and without sharing any of this data, resulting is as accurate an inversion model as possible.

Further, while a traditional inversion attack requires exposing the algorithm to huge numbers of inputs, there is never a guarantee the inversion attack includes all training data in the input set. Here, the threat model inverter 520 can train the attack model on all training data as well as a large set of non-training data inputs. It should be noted that a series of different terms are being utilized interchangeably herein to describe the inversion attack model. These include an "inversion model", a "threat model", an "attack model", an "inversion attack model", an "inversion threat model" and the like. These terms should all be read interchangeably as an AI model that is trained on the classification vector of the legitimate trained algorithm in order to detect when an input to the said inversion model constitutes an article of the dataset that was used to train the legitimate trained algorithm. Most often the inversion threat model is designed by a bad actor for the purpose of exfiltrating data, but may also be generated by a regulator, or some other interested party, to determine the security of the legitimate algorithm.

Figure 5C:
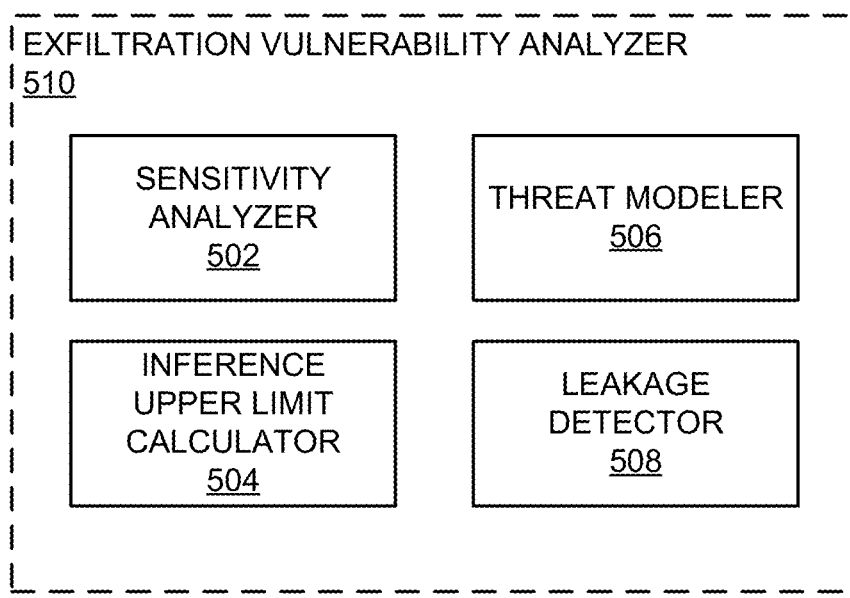
FIG. 5C is an example block diagram showing an exfiltration vulnerability analyzer, in accordance with some embodiment.

As noted above, the threat model built by the threat model inverter 520 is a 'gold standard' and performs at the maximum level as compared against any inversion attack models that are generated in situ. This is because the threat model built by the threat model inverter 520 has access to all of the key elements (training data, classification vectors, etc.) which are available within the enclave and can be computed upon without human intervention and without sharing any of this data. Thus a theoretical "maximum vulnerability" to exfiltration of data using the trained algorithm can be attained. The exfiltration vulnerability analyzer 510 consumes this 'gold standard' inversion model and determines the actual concern posed by the given algorithm weight profile. The exfiltration vulnerability analyzer 510 is comprised of four parts, and can be seen in relation to FIG. 5C. These include a sensitivity analyzer 502 an inference upper limit calculator 504 a threat modeler 506 and a leakage detector 508. The sensitivity analyzer 502 does an initial screening of the training data (private data) to actually discern what data is considered private versus data that is not important if it is shared. In many datasets there is a substantial volume of data. For example a record may include the individuals name, age, patient ID, vitals, diagnosis, and various lab results. Regulations vary by jurisdiction, but generally basic vital data are not important information from a privacy perspective. Thus, only fields that are sensitive if they were to be exfiltrated may be flagged by the sensitivity analyzer 502. Another practical constraint on the exfiltration of private data is the volume of data that may be exfiltrated. An inference upper limit calculator 504 may utilize the inversion model, the algorithm and the data type being consumed by the algorithm in order to determine what the practical rate of data exfiltration actually is. For example, the algorithm and/or inversion model may be very complex, and may require vast amounts of computing resources. In such situations it may take days in order to generate just a few inferences of the training data. Even if the inversion model is very accurate, in this situation, the practical difficulty of actually performing the exfiltration may be protection enough. Likewise, if the input into the algorithm is a chest x-ray, practically the generation of synthetic images needed to exfiltrate actual patient data may be impractical if not impossible.

The threat modeler 506 consumes the data that is flagged as sensitive (from the sensitivity analyzer 502) and the inversion model from the threat model inverter 520 to identify the actual risk, in terms of inputs needed to generate an inference (exfiltration event) of a piece of private data (as opposed to any random data type) in a given time period. This information may be taken by the leakage detector 508, along with the inference upper limit data (from the inference upper limit calculator 504) to determine the probability of a leakage event occurring as a function of time and resources available. This metric is provided to a determiner 540, as seen in FIG. 5B, for a determination of what to either recommend or output. If the risk of data exfiltration in a given time period with a base level of computing resources is above a configured threshold, then the weighted algorithm may be deemed 'too risky' or 'too vulnerable'. The system may then provide a recommendation 507 to increase the noise mixture into the training set (either differential privacy Gaussian noise, as noise generated from the inversion model, or using other techniques to reduce the risk profile of the model) and then retraining the algorithm at the runtime server 330. This results in a new set of weights 510 and the analysis may be iteratively performed.

As noted before, the runtime server 330 also includes the ability to model the algorithm's performance. The introduction of noise into a training set, while beneficial to prevent exfiltration by an inversion attack, generally has the negative impact of reducing algorithm accuracy/performance. After the algorithm is trained with the recommendation to increase the noise mixture, the performance of this newly trained model may be analyzed. This information may be provided back to the model privacy assessor 450 and particularly to the determiner 540. When an algorithm is determined by the exfiltration vulnerability analyzer 510 shows the risk of exfiltration in a given time for a computing resource budget is found to be 'too risky', and the model performance is still within an acceptable level, the recommendation 507 for additional noise mixture and retraining may repeat on in an iterative manner. In contrast, if the determiner 540 decides the exfiltration vulnerability is 'too risky' but the algorithm performance has degraded too much (poor performance of the algorithm), the system may revert to a algorithm version with the highest performance and sent to a normalizer 550. The normalizer 550 alters the algorithm to produce a singe output (the classification) along with an indication of the confidence of the classification (e.g., high/medium/low, 1-5, percentage, etc.). This differs from a classification vector, which is susceptible to an inversion attack, as the single classification and confidence metric cannot be used to train an inversion model. The output of this normalization is a deployment model 505. Generally, a deployment model 505 is not as desirable as an algorithm that produces a classification vector (at least from the algorithm developer's perspective), so only when it is not possible to generate an algorithm that meets both exfiltration vulnerability limits and performance requirements is this outputted. Ideally, however, the determiner will receive an analysis from the runtime server 330 that a model performance is acceptable and an analysis from the exfiltration vulnerability analyzer 510 that the trained algorithm (either originally, or after multiple noise injection iterations) has an exfiltration vulnerability risk that is lower than a threshold. In these cases, the weights 503 for the algorithm may be outputted.

Figure 17:
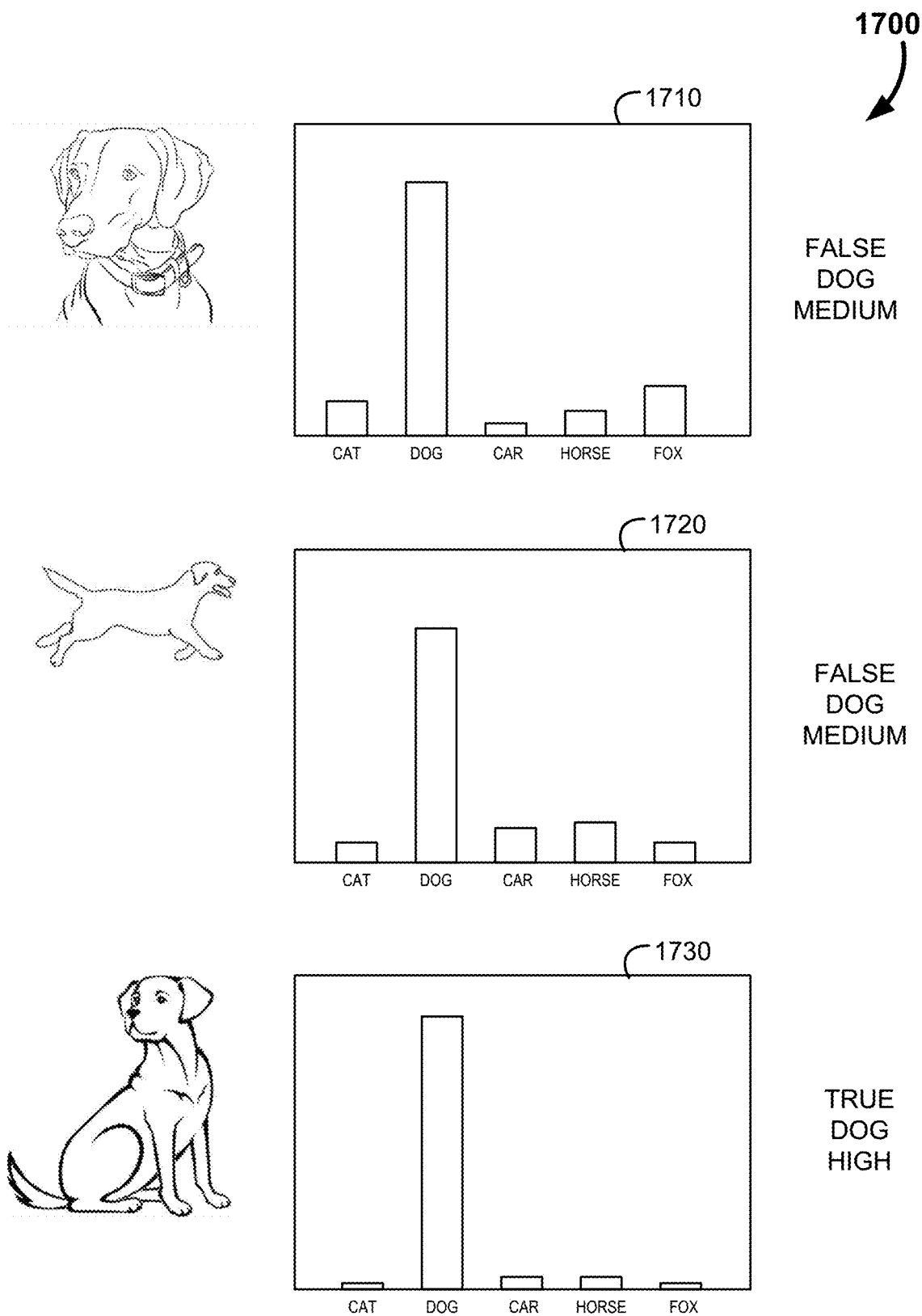
FIG. 17 is an example illustration of algorithm outputs for given inputs without exfiltration protection, in accordance with some embodiments.

Turning now to FIG. 17 where a series of illustrations (shown at 1700) are provided to assist in explaining the concept of an inversion attack and the possible outcomes of the above described exfiltration vulnerability analysis and remediation. In this example, the algorithm is an image recognition algorithm that consumes images, and classifies them as either cats, dogs, cars, horses or foxes. The images on the left are classified as a classification vector, each of which is presented in graphical format for each of the classification buckets. For each of these images, the algorithm correctly identifies the image as a 'dog', but as can be seen, the distribution of the classifications differ between the associated image. The top image for example is not part of the training set (labeled as "false") but is accurately identified as a "dog" with a "medium" degree of confidence given the classification vector 1710. The second image is also not part of the training set, but is likewise determined to be a dog with a medium degree of confidence given the classification profile 1720. The third image is part of the training set ("true") and as can be seen by the classification profile 1730 indicates the image is a dog with a high degree of confidence. An inversion attack algorithm that is allowed to consume the classification vectors 1710, 1720 and 1730 would be capable, at a relatively high confidence level, to be able to single out the image that is part of the training set. As such, an algorithm with this kind of output would be deemed "too risky" for data exfiltration, and would be prevented from being released from the secure computing node. The options would be to increase noise mixture in order to alter the algorithm performance or to generate a deployment model that only outputs the single classification (here 'dog' for all images) and the relative confidence (here 'medium, medium, high'). Such basic information obviously assists in the classification of the image, but cannot form the basis of an inversion attack.

Figure 18:
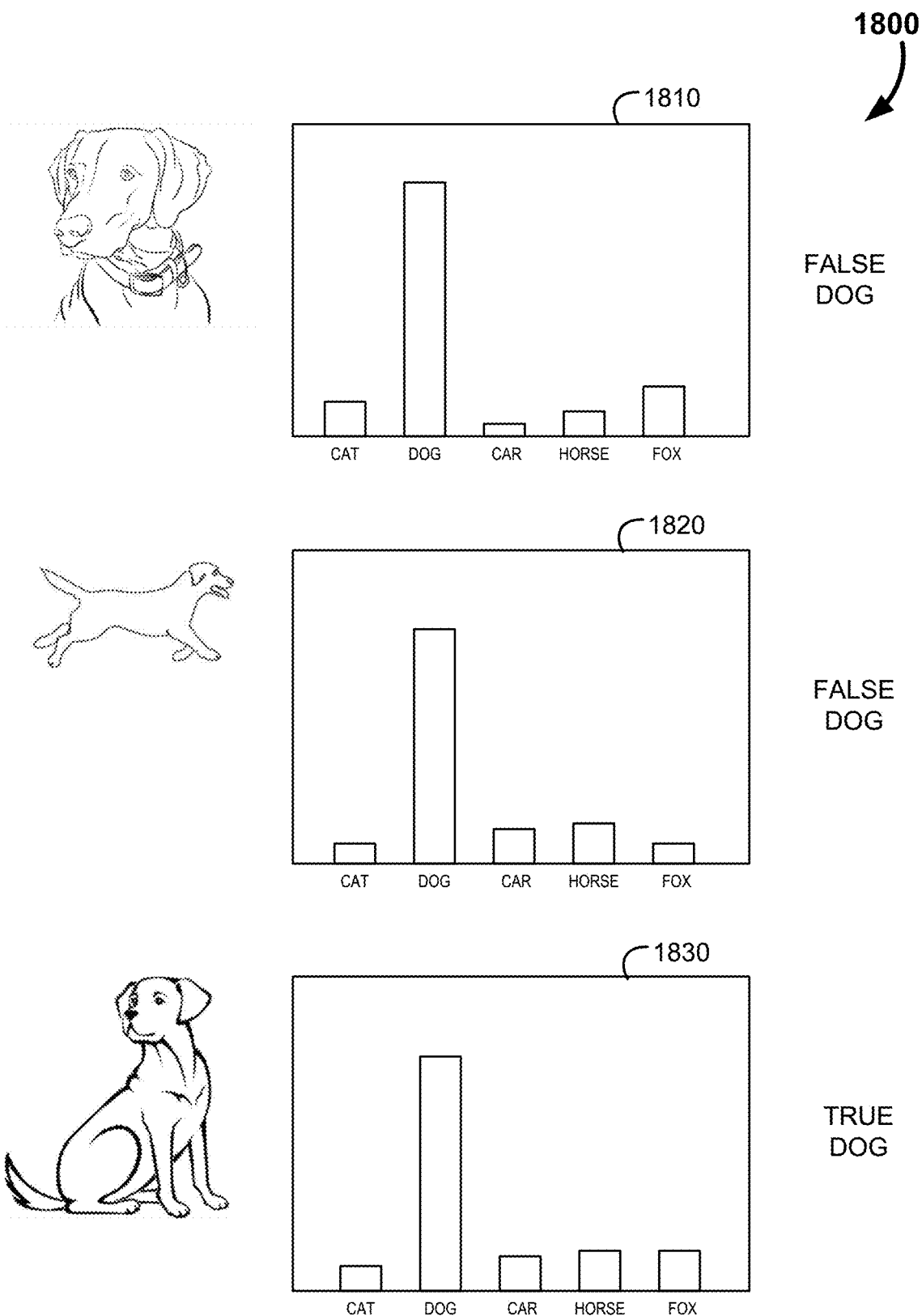
FIG. 18 is an example illustration of algorithm outputs for given inputs with exfiltration protection, in accordance with some embodiments.

In the situation where noise is introduced into the training data, model performance is changed (typically for the worse), but not necessarily below a performance floor. FIG. 18 provides a series of illustrations for a situation where the noise mixture has been increased in the training set. Noise, as discussed before may include randomized noise, or may be targeted noise addition. Targeted noise addition may include only adding noise to sensitive fields (e.g., noise to patient names and lab results but not to basic vitals such as blood pressure) or noise that is selected through an inversion model to be most disruptive to the generation of an inversion attack while minimizing algorithm performance. Here, the top two images are both classified as dogs with differing classification vectors 1810 and 1820. Despite not being included in to training set ("false") these are both classified correctly, with a relatively high degree of confidence. The third image is also classified as a dog, with a relatively high confidence. However, here the image was a part of the training dataset ("true"). Looking at the classification vector 1830, it is not possible to differentiate this from the other false classification vectors 1810 and 1820. As such, this algorithm output is not susceptible to an inversion attack.

Figure 6:
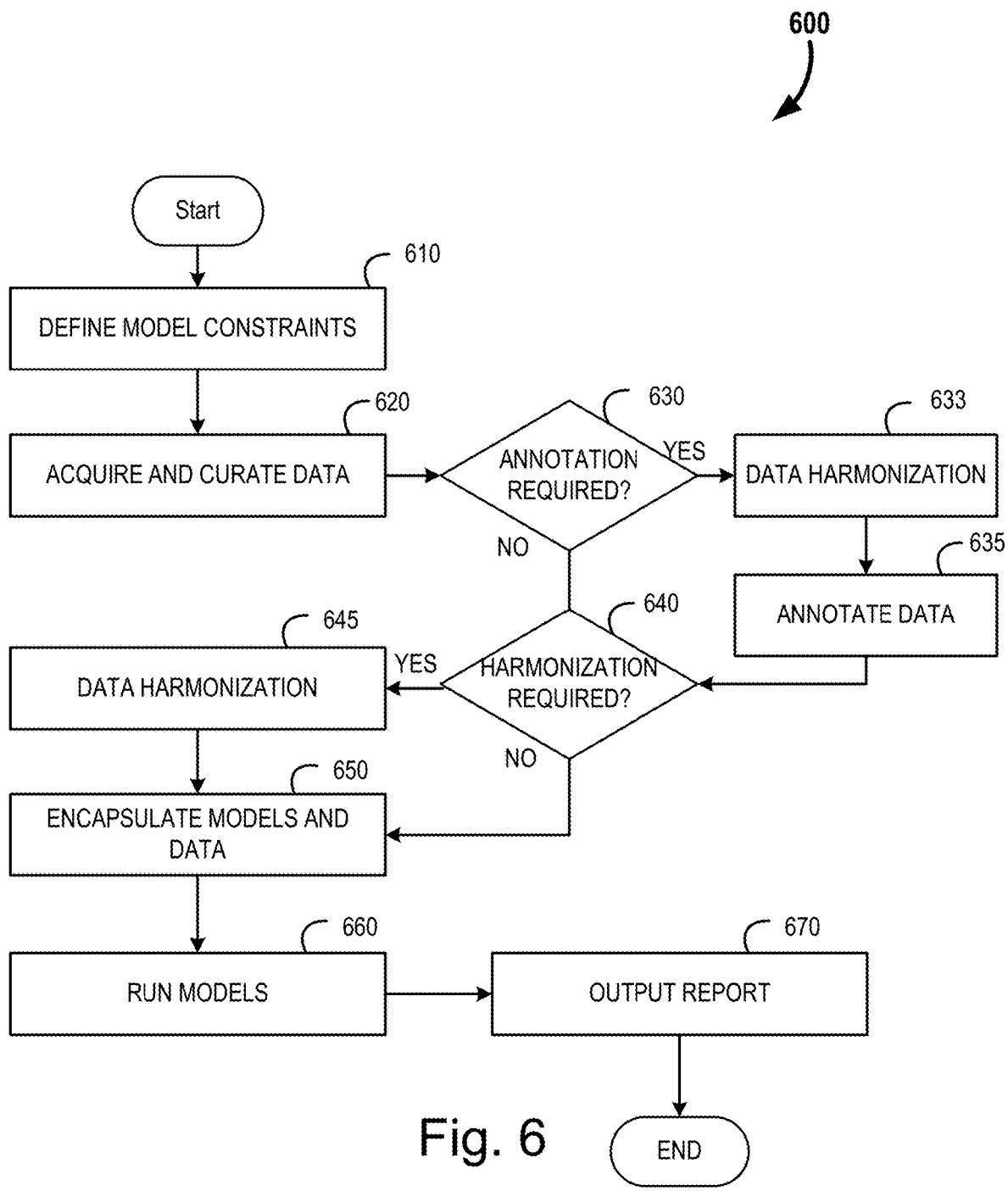
FIG. 6 is a flowchart for an example process for the operation of the zero-trust data processing system, in accordance with some embodiment.

Turning to FIG. 6, one embodiment of the process for deployment and running of algorithms within the sequestered computing nodes is illustrated, at 600. Initially the algorithm developer provides the algorithm to the system. The at least one algorithm/model is generated by the algorithm developer using their own development environment, tools, and seed data sets (e.g., training/testing data sets). In some embodiments, the algorithms may be trained on external datasets instead, as will be discussed further below. The algorithm developer provides constraints (at 610) for the optimization and/or validation of the algorithm(s). Constraints may include any of the following: (i) training constraints, (ii) data preparation constraints, and (iii) validation constraints. These constraints define objectives for the optimization and/or validation of the algorithm(s) including data preparation (e.g., data curation, data transformation, data harmonization, and data annotation), model training, model validation, and reporting.

In some embodiments, the training constraints may include, but are not limited to, at least one of the following: hyperparameters, regularization criteria, convergence criteria, algorithm termination criteria, training/validation/test data splits defined for use in algorithm(s), and training/testing report requirements. A model hyper parameter is a configuration that is external to the model, and which value cannot be estimated from data. The hyperparameters are settings that may be tuned or optimized to control the behavior of a ML or AI algorithm and help estimate or learn model parameters.

Regularization constrains the coefficient estimates towards zero. This discourages the learning of a more complex model in order to avoid the risk of overfitting. Regularization, significantly reduces the variance of the model, without a substantial increase in its bias. The convergence criterion is used to verify the convergence of a sequence (e.g., the convergence of one or more weights after a number of iterations). The algorithm termination criteria define parameters to determine whether a model has achieved sufficient training. Because algorithm training is an iterative optimization process, the training algorithm may perform the following steps multiple times. In general, termination criteria may include performance objectives for the algorithm, typically defined as a minimum amount of performance improvement per iteration or set of iterations.

The training/testing report may include criteria that the algorithm developer has an interest in observing from the training, optimization, and/or testing of the one or more models. In some instances, the constraints for the metrics and criteria are selected to illustrate the performance of the models. For example, the metrics and criteria such as mean percentage error may provide information on bias, variance, and other errors that may occur when finalizing a model such as vanishing or exploding gradients. Bias is an error in the learning algorithm. When there is high bias, the learning algorithm is unable to learn relevant details in the data. Variance is an error in the learning algorithm, when the learning algorithm tries to over-learn from the dataset or tries to fit the training data as closely as possible. Further, common error metrics such as mean percentage error and R2 score are not always indicative of accuracy of a model, and thus the algorithm developer may want to define additional metrics and criteria for a more in depth look at accuracy of the model.

Figure 7A:
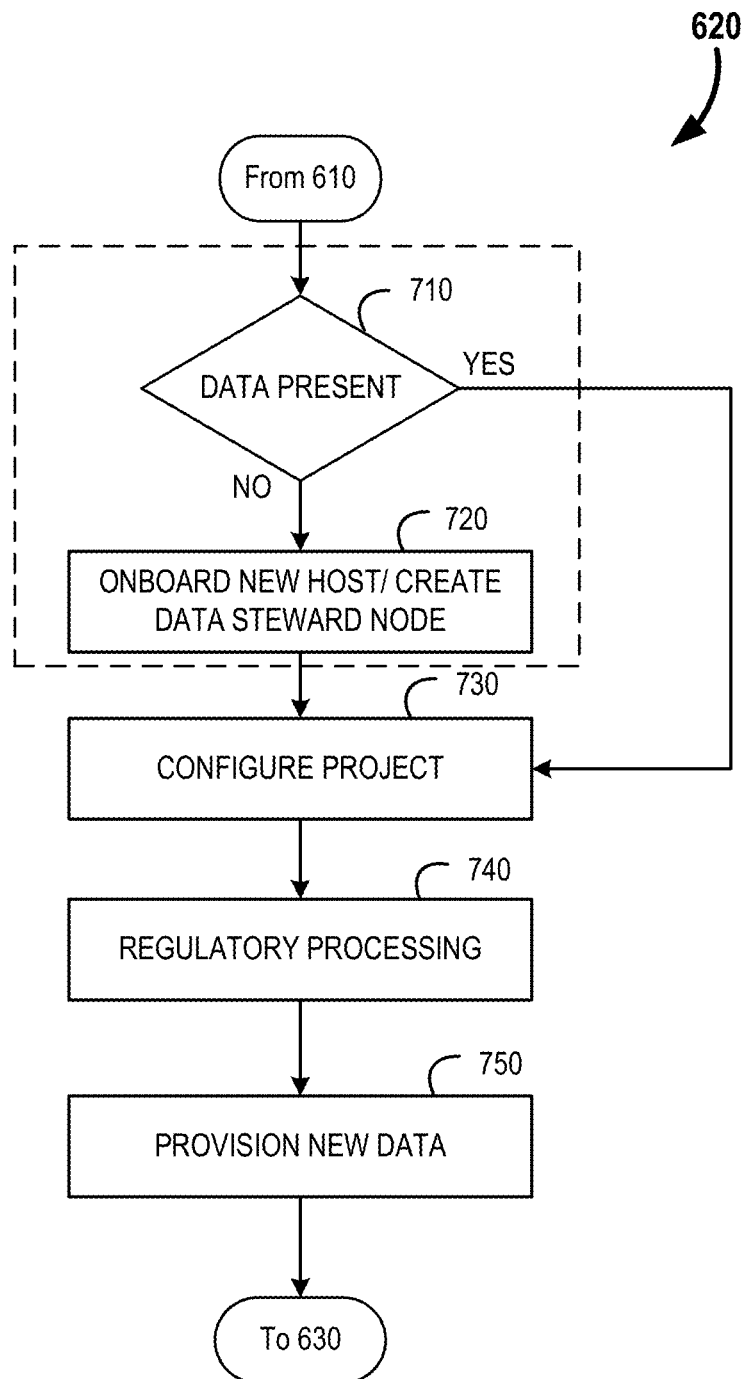
FIG. 7A a flowchart for an example process of acquiring and curating data, in accordance with some embodiment.

Next, data assets that will be subjected to the algorithm(s) are identified, acquired, and curated (at 620). FIG. 7A provides greater detail of this acquisition and curation of the data. Often, the data may include healthcare related data (PHI). Initially, there is a query if data is present (at 710). The identification process may be performed automatically by the platform running the queries for data assets (e.g., running queries on the provisioned data stores using the data indices) using the input data requirements as the search terms and/or filters. Alternatively, this process may be performed using an interactive process, for example, the algorithm developer may provide search terms and/or filters to the platform. The platform may formulate questions to obtain additional information, the algorithm developer may provide the additional information, and the platform may run queries for the data assets (e.g., running queries on databases of the one or more data hosts or web crawling to identify data hosts that may have data assets) using the search terms, filters, and/or additional information. In either instance, the identifying is performed using differential privacy for sharing information within the data assets by describing patterns of groups within the data assets while withholding private information about individuals in the data assets.

Figure 7B:
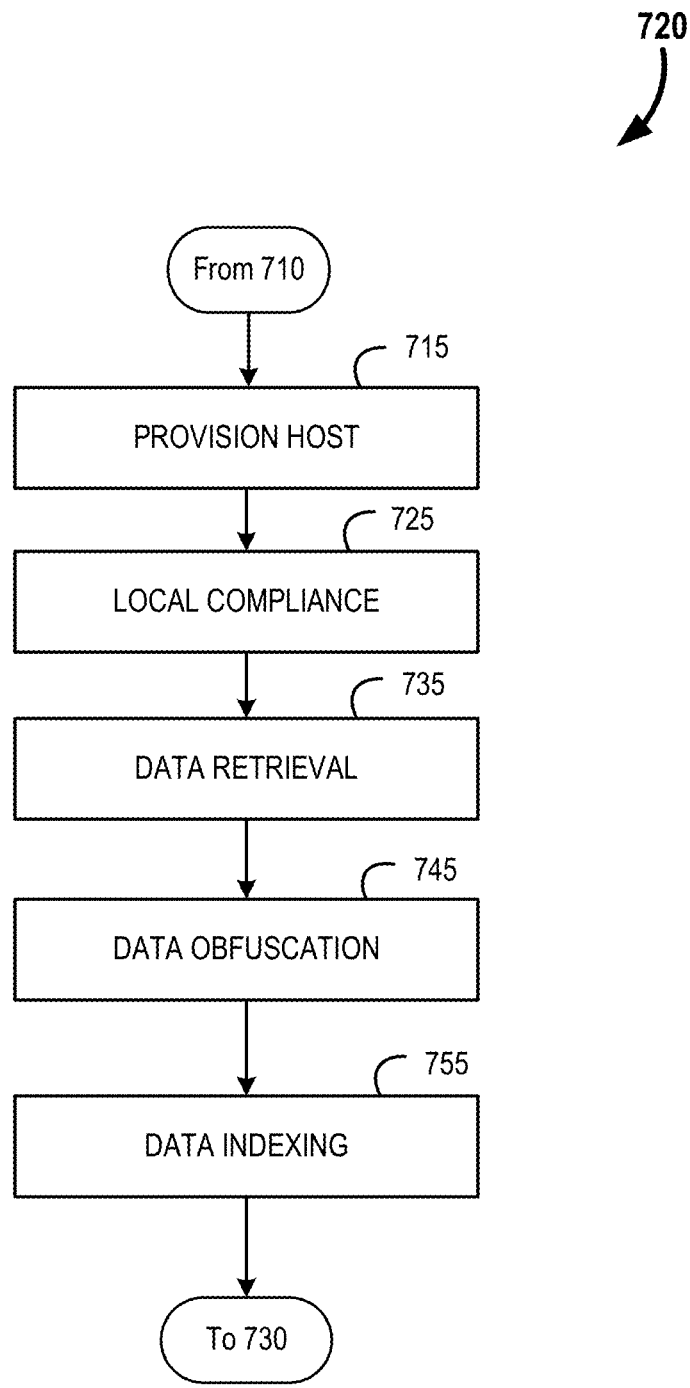
FIG. 7B a flowchart for an example process of onboarding a new host data steward, in accordance with some embodiment.

If the assets are not available, the process generates a new data steward node (at 720). The data query and onboarding activity (surrounded by a dotted line) is illustrated in this process flow of acquiring the data; however, it should be realized that these steps may be performed anytime prior to model and data encapsulation (step 650 in FIG. 6). Onboarding/creation of a new data steward node is shown in greater detail in relation to FIG. 7B. In this example process a data host compute and storage infrastructure (e.g., a sequestered computing node as described with respect to FIGS. 1A-5) is provisioned (at 715) within the infrastructure of the data steward. In some instances, the provisioning includes deployment of encapsulated algorithms in the infrastructure, deployment of a physical computing device with appropriately provisioned hardware and software in the infrastructure, deployment of storage (physical data stores or cloud-based storage), or deployment on public or private cloud infrastructure accessible via the infrastructure, etc.

Next, governance and compliance requirements are performed (at 725). In some instances, the governance and compliance requirements includes getting clearance from an institutional review board, and/or review and approval of compliance of any project being performed by the platform and/or the platform itself under governing law such as the Health Insurance Portability and Accountability Act (HIPAA). Subsequently, the data assets that the data steward desires to be made available for optimization and/or validation of algorithm(s) are retrieved (at 735). In some instances, the data assets may be transferred from existing storage locations and formats to provisioned storage (physical data stores or cloud-based storage) for use by the sequestered computing node (curated into one or more data stores). The data assets may then be obfuscated (at 745). Data obfuscation is a process that includes data encryption or tokenization, as discussed in much greater detail below. Lastly, the data assets may be indexed (at 755). Data indexing allows queries to retrieve data from a database in an efficient manner. The indexes may be related to specific tables and may be comprised of one or more keys or values to be looked up in the index (e.g., the keys may be based on a data table's columns or rows).

Returning to FIG. 7A, after the creation of the new data steward, the project may be configured (at 730). In some instances, the data steward computer and storage infrastructure is configured to handle a new project with the identified data assets. In some instances, the configuration is performed similarly to the process described of FIG. 7B. Next, regulatory approvals (e.g., IRB and other data governance processes) are completed and documented (at 740). Lastly, the new data is provisioned (at 750). In some instances, the data storage provisioning includes identification and provisioning of a new logical data storage location, along with creation of an appropriate data storage and query structure.

Returning now to FIG. 6, after the data is acquired and configured, a query is performed if there is a need for data annotation (at 630). If so, the data is initially harmonized (at 633) and then annotated (at 635). Data harmonization is the process of collecting data sets of differing file formats, naming conventions, and columns, and transforming it into a cohesive data set. The annotation is performed by the data steward in the sequestered computing node. A key principle to the transformation and annotation processes is that the platform facilitates a variety of processes to apply and refine data cleaning and transformation algorithms, while preserving the privacy of the data assets, all without requiring data to be moved outside of the technical purview of the data steward.

Figure 8:
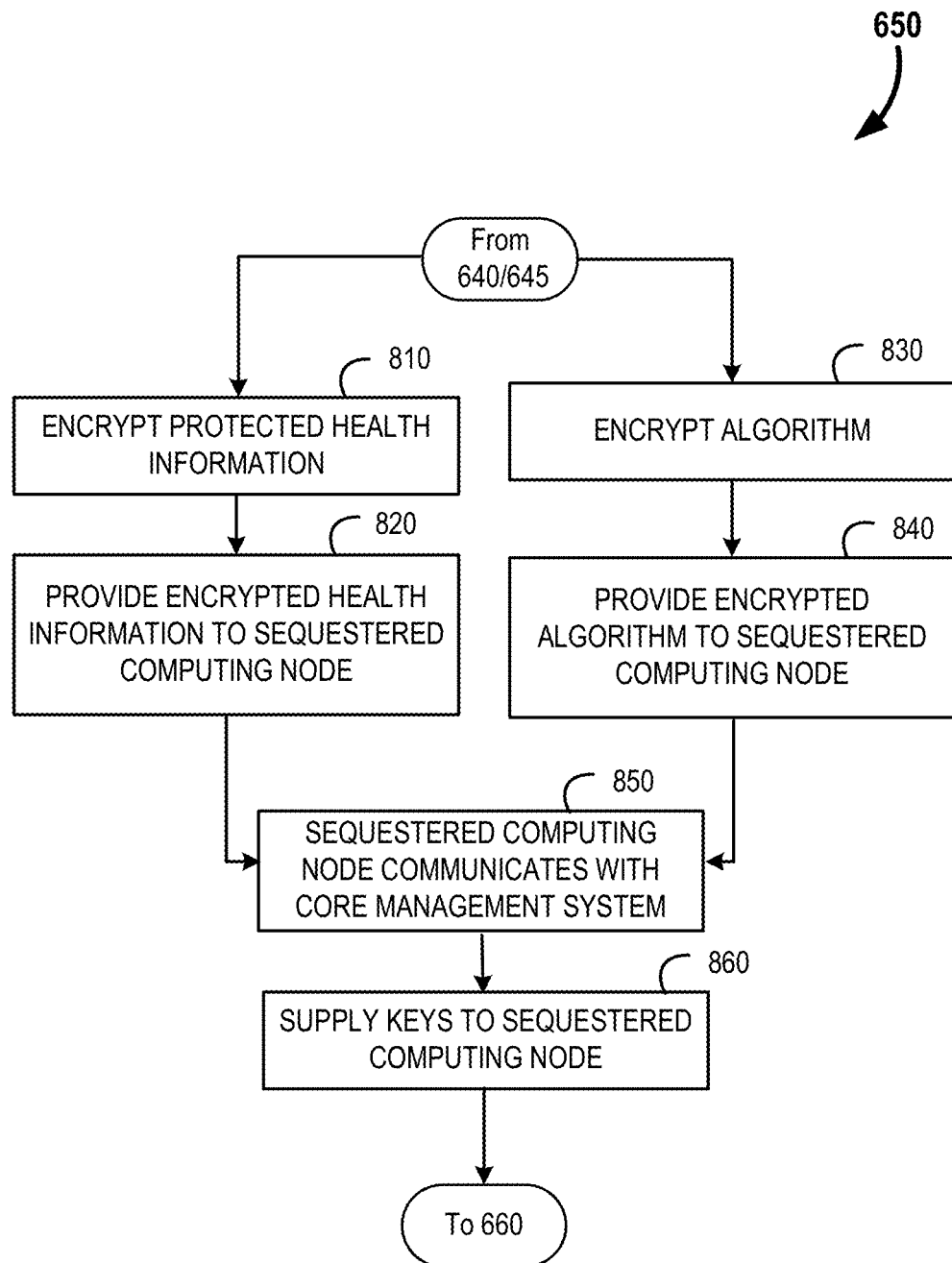
FIG. 8 is a flowchart for an example process of encapsulating the algorithm and data, in accordance with some embodiment.

After annotation, or if annotation was not required, another query determines if additional data harmonization is needed (at 640). If so, then there is another harmonization step (at 645) that occurs in a manner similar to that disclosed above. After harmonization, or if harmonization isn't needed, the models and data are encapsulated (at 650). Data and model encapsulation is described in greater detail in relation to FIG. 8. In the encapsulation process the protected data, and the algorithm are each encrypted (at 810 and 830 respectively). In some embodiments, the data is encrypted either using traditional encryption algorithms (e.g., RSA) or homomorphic encryption.

Next the encrypted data and encrypted algorithm are provided to the sequestered computing node (at 820 and 840 respectively). There processes of encryption and providing the encrypted payloads to the sequestered computing nodes may be performed asynchronously, or in parallel. Subsequently, the sequestered computing node may phone home to the core management node (at 850) requesting the keys needed. These keys are then also supplied to the sequestered computing node (at 860), thereby allowing the decryption of the assets.

Returning again to FIG. 6, once the assets are all within the sequestered computing node, they may be decrypted, and the algorithm may run against the dataset (at 660). The results from such runtime may be outputted as a report (at 670) for downstream consumption.

Figure 9:
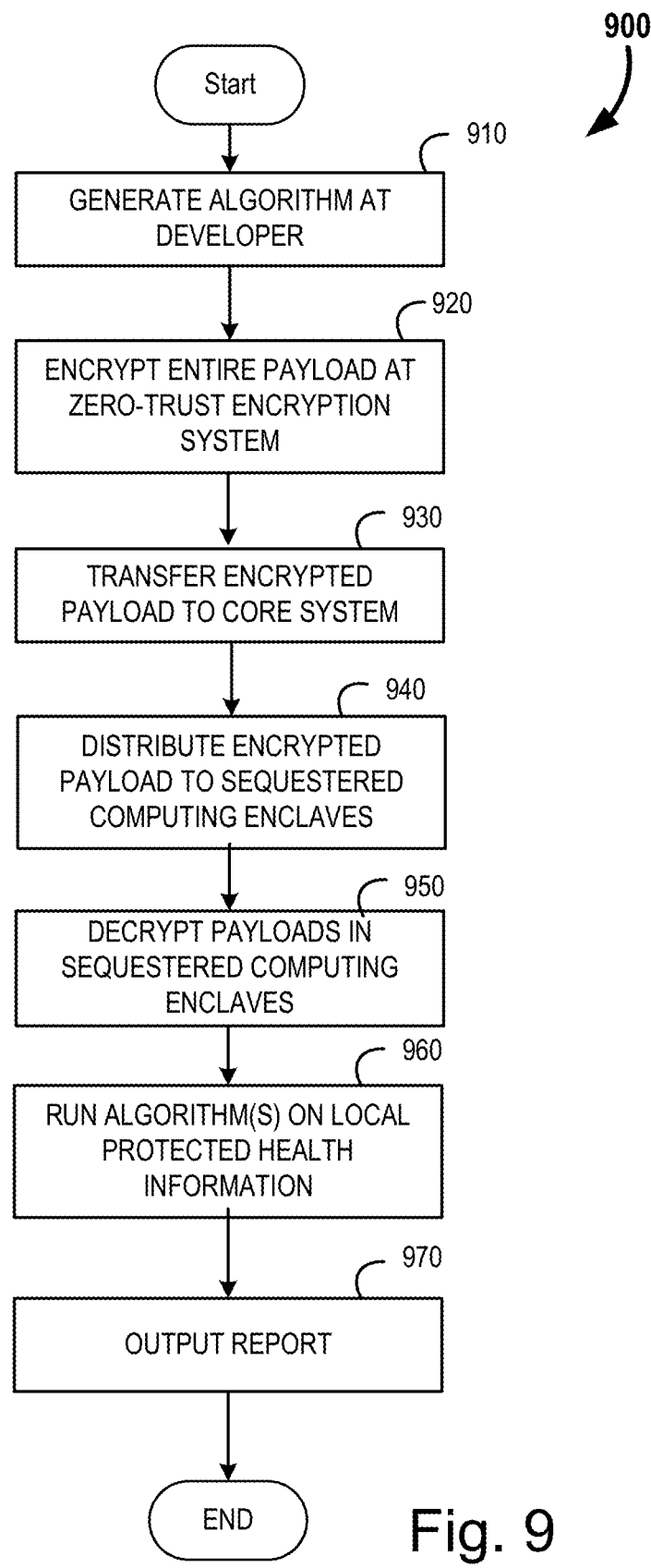
FIG. 9 is a flowchart for an example process of a first model of algorithm encryption and handling, in accordance with some embodiment.

Turning now to FIG. 9, a first embodiment of the system for zero-trust processing of the data assets by the algorithm is provided, at 900. In this example process, the algorithm is initially generated by the algorithm developer (at 910) in a manner similar to that described previously. The entire algorithm, including its container, is then encrypted (at 920), using a public key, by the encryption server within the zero-trust system of the algorithm developer's infrastructure. The entire encrypted payload is provided to the core management system (at 930). The core management system then distributes the encrypted payload to the sequestered computing enclaves (at 940).

Likewise, the data steward collects the data assets desired for processing by the algorithm. This data is also provided to the sequestered computing node. In some embodiments, this data may also be encrypted. The sequestered computing node then contacts the core management system for the keys. The system relies upon public-private key methodologies for the decryption of the algorithm, and possibly the data (at 950).

After decryption within the sequestered computing node, the algorithm(s) are run (at 960) against the protected health information (or other sensitive information based upon the given use case). The results are then output (at 970) to the appropriate downstream audience (generally the data steward, but may include public health agencies or other interested parties).

Figure 10:
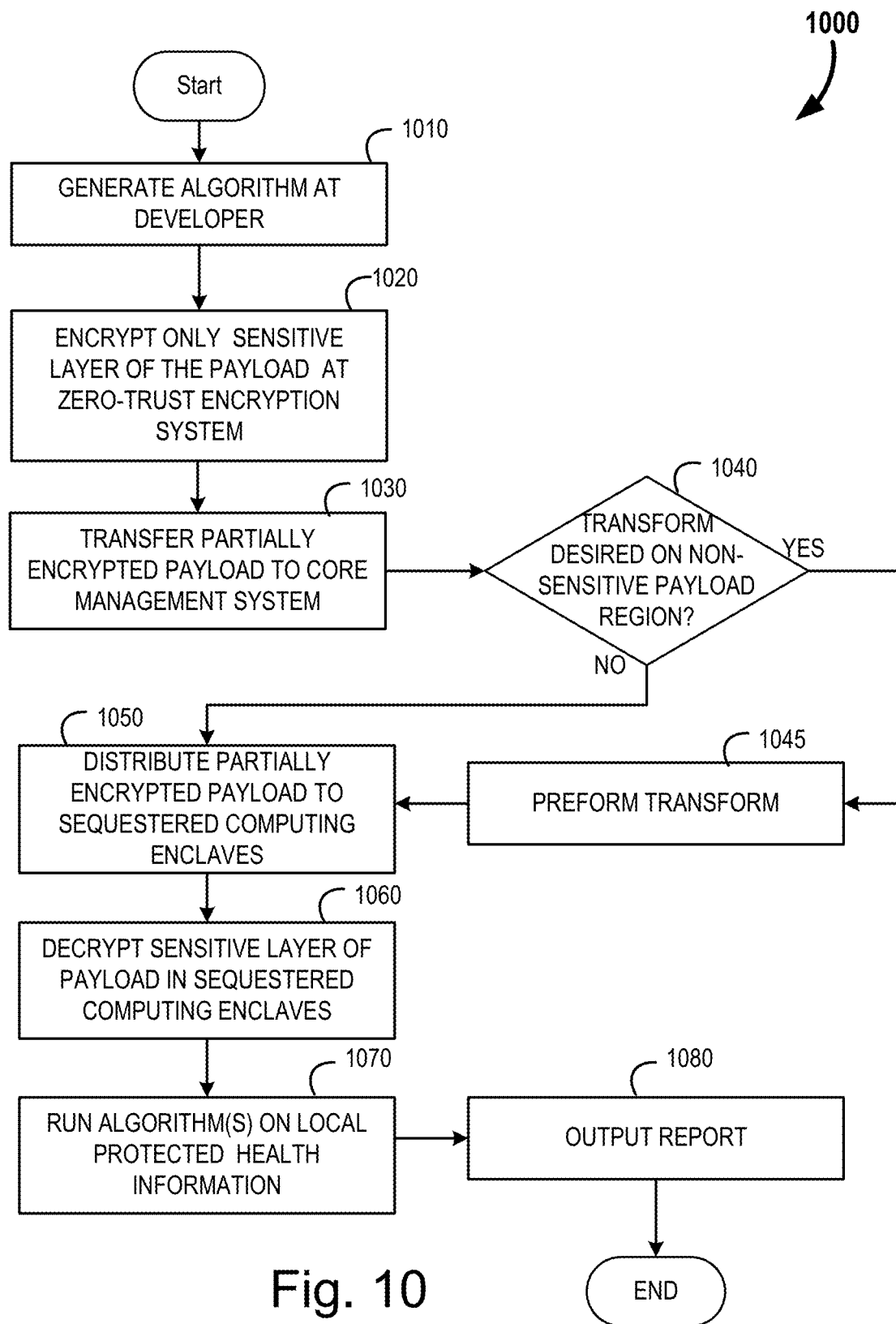
FIG. 10 is a flowchart for an example process of a second model of algorithm encryption and handling, in accordance with some embodiments.

FIG. 10, on the other hand, provides another methodology of zero-trust computation that has the advantage of allowing some transformation of the algorithm data by either the core management system or the data steward themselves, shown generally at 1000. As with the prior embodiment, the algorithm is initially generated by the algorithm developer (at 1010). However, at this point the two methodologies diverge. Rather than encrypt the entire algorithm payload, it differentiates between the sensitive portions of the algorithm (generally the algorithm weights), and non-sensitive portions of the algorithm (including the container, for example). The process then encrypts only layers of the payload that have been flagged as sensitive (at 1020).

The partially encrypted payload is then transferred to the core management system (at 1030). At this stage a determination is made whether a modification is desired to the non-sensitive, non-encrypted portion of the payload (at 1040). If a modification is desired, then it may be performed in a similar manner as discussed previously (at 1045).

If no modification is desired, or after the modification is performed, the payload may be transferred (at 1050) to the sequestered computing node located within the data steward infrastructure (or a third party). Although not illustrated, there is again an opportunity at this stage to modify any non-encrypted portions of the payload when the algorithm payload is in the data steward's possession.

Next, the keys unique to the sequestered computing node are employed to decrypt the sensitive layer of the payload (at 1060), and the algorithms are run against the locally available protected health information (at 1070). In the use case where a third party is hosting the sequestered computing node, the protected health information may be encrypted at the data steward before being transferred to the sequestered computing node at said third party. Regardless of sequestered computing node location, after runtime, the resulting report is outputted to the data steward and/or other interested party (at 1080).

Figure 11:
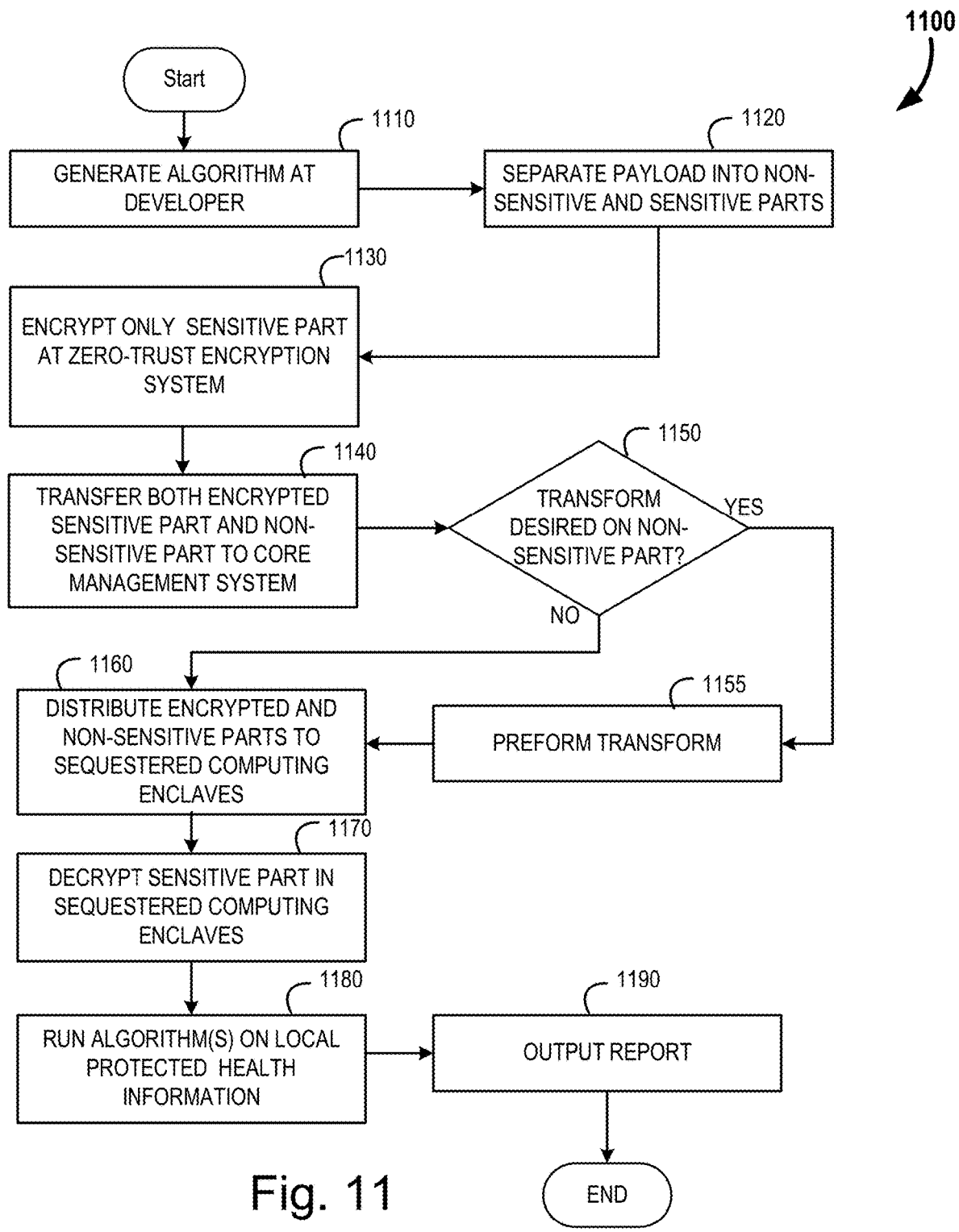
FIG. 11 is a flowchart for an example process of a third model of algorithm encryption and handling, in accordance with some embodiments.

FIG. 11, as seen at 1100, is similar to the prior two figures in many regards. The algorithm is similarly generated at the algorithm developer (at 1110); however, rather than being subject to an encryption step immediately, the algorithm payload may be logically separated into a sensitive portion and a non-sensitive portion (at 1120). To ensure that the algorithm runs properly when it is ultimately decrypted in the (sequestered) sequestered computing enclave, instructions about the order in which computation steps are carried out may be added to the unencrypted portion of the payload.

Subsequently, the sensitive portion is encrypted at the zero-trust encryption system (at 1130), leaving the non-sensitive portion in the clear. Both the encrypted portion and the non-encrypted portion of the payload are transferred to the core management system (at 1140). This transfer may be performed as a single payload, or may be done asynchronously. Again, there is an opportunity at the core management system to perform a modification of the non-sensitive portion of the payload. A query is made if such a modification is desired (at 1150), and if so it is performed (at 1155). Transformations may be similar to those detailed above.

Subsequently, the payload is provided to the sequestered computing node(s) by the core management system (at 1160). Again, as the payload enters the data steward node(s), it is possible to perform modifications to the non-encrypted portion(s). Once in the sequestered computing node, the sensitive portion is decrypted (at 1170), the entire algorithm payload is run (at 1180) against the data that has been provided to the sequestered computing node (either locally or supplied as an encrypted data package). Lastly, the resulting report is outputted to the relevant entities (at 1190).

Any of the above modalities of operation provide the instant zero-trust architecture with the ability to process a data source with an algorithm without the ability for the algorithm developer to have access to the data being processed, the data steward being unable to view the algorithm being used, or the core management system from having access to either the data or the algorithm. This uniquely provides each party the peace of mind that their respective valuable assets are not at risk, and facilitates the ability to easily, and securely, process datasets.

Figure 12:
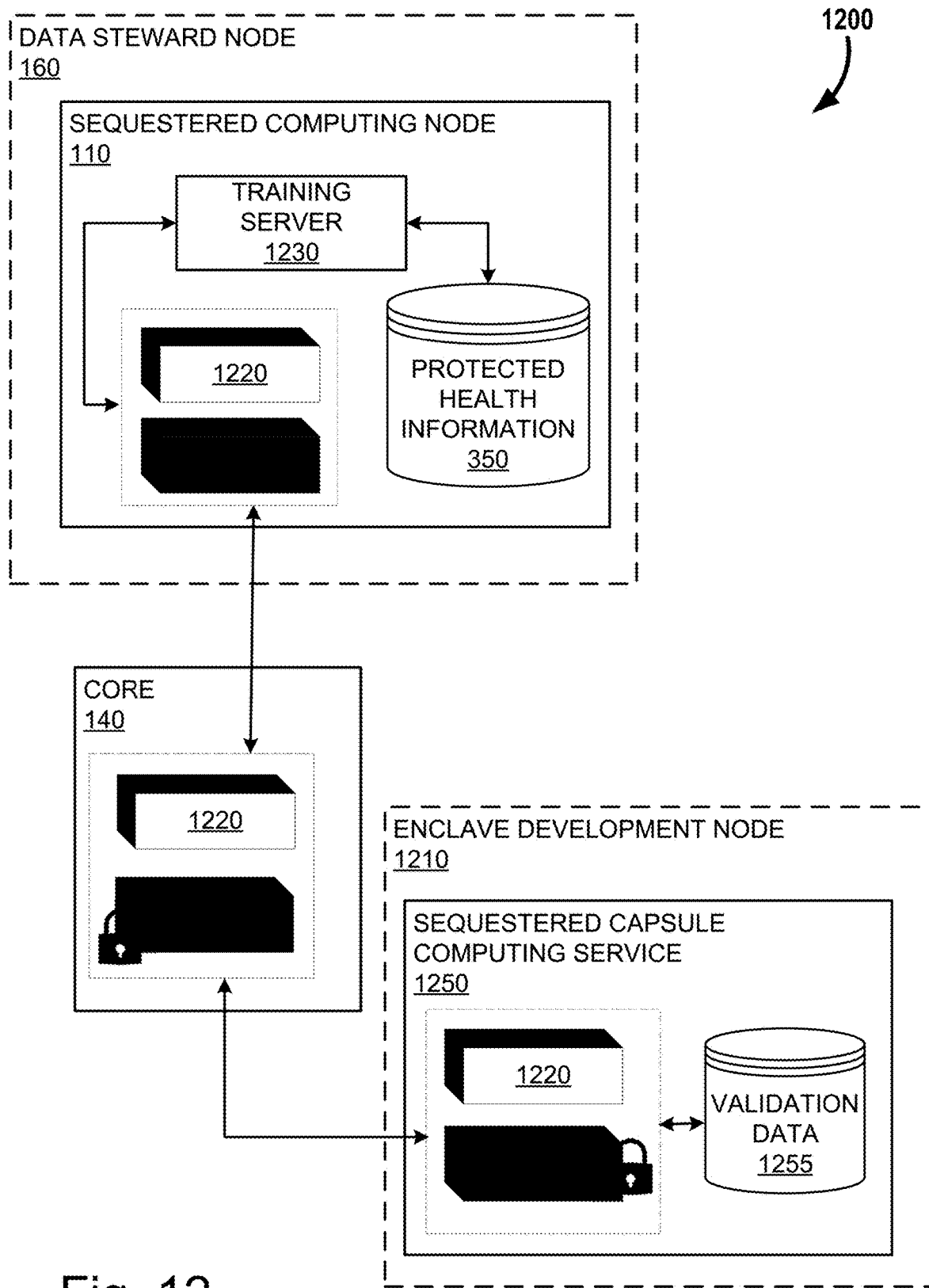
FIG. 12 is an example block diagram showing the training of the model within a zero-trust environment, in accordance with some embodiments.

Turning now to FIG. 12, a system for zero-trust training of algorithms is presented, generally at 1200. Traditionally, algorithm developers require training data to develop and refine their algorithms. Such data is generally not readily available to the algorithm developer due to the nature of how such data is collected, and due to regulatory hurdles. As such, the algorithm developers often need to rely upon other parties (data stewards) to train their algorithms. As with running an algorithm, training the algorithm introduces the potential to expose the algorithm and/or the datasets being used to train it.

In this example system, the nascent algorithm is provided to the sequestered computing node 110 in the data steward node 160. This new, untrained algorithm may be prepared by the algorithm developer (not shown) and provided in the clear to the sequestered computing node 110 as it does not yet contain any sensitive data. The sequestered computing node leverages the locally available protected health information 350, using a training server 1230, to train the algorithm. This generates a sensitive portion of the algorithm 1225 (generally the weights and coefficients of the algorithm), and a non-sensitive portion of the algorithm 1220. As the training is performed within the sequestered computing node 110, the data steward 160 does not have access to the algorithm that is being trained. Once the algorithm is trained, the sensitive portion 1225 of the algorithm is encrypted prior to being released from the sequestered computing enclave 110. This partially encrypted payload is then transferred to the data management core 140, and distributed to a sequestered capsule computing service 1250, operating within an enclave development node 1210. The enclave development node is generally hosted by one or more data stewards.

The sequestered capsule computing node 1250 operates in a similar manner as the sequestered computing node 110 in that once it is "locked" there is no visibility into the inner workings of the sequestered capsule computing node 1250. As such, once the algorithm payload is received, the sequestered capsule computing node 1250 may decrypt the sensitive portion of the algorithm 1225 using a public-private key methodology. The sequestered capsule computing node 1250 also has access to validation data 1255. The algorithm is run against the validation data, and the output is compared against a set of expected results. If the results substantially match, it indicates that the algorithm is properly trained, if the results do not match, then additional training may be required.

Figure 13:
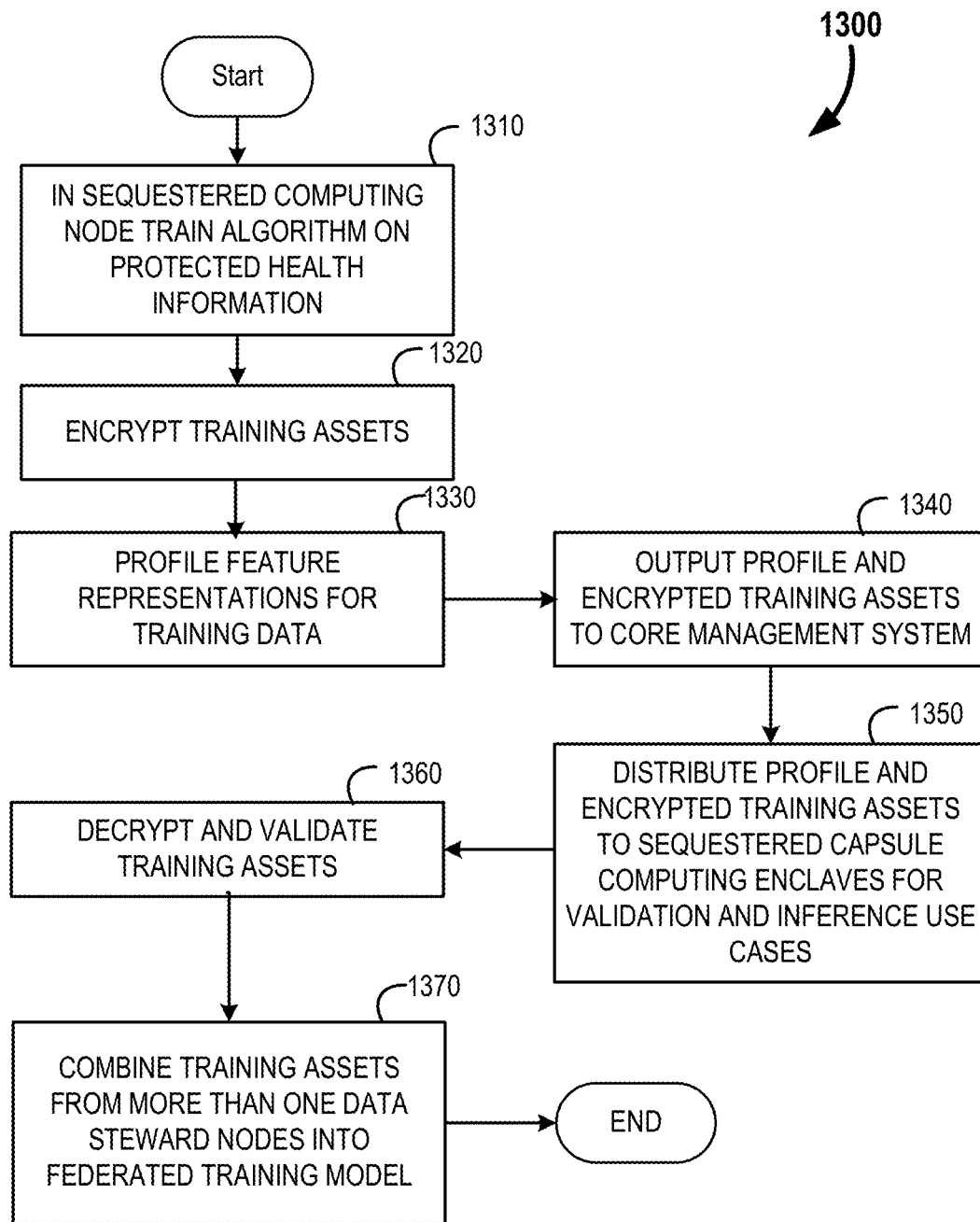
FIG. 13 is a flowchart for an example process of training of the model within a zero-trust environment, in accordance with some embodiments.

FIG. 13 provides the process flow, at 1300, for this training methodology. In the sequestered computing node, the algorithm is initially trained (at 1310). The training assets (sensitive portions of the algorithm) are encrypted within the sequestered computing node (at 1320). Subsequently the feature representations for the training data are profiled (at 1330). One example of a profiling methodology would be to take the activations of the certain AI model layers for samples in both the training and test set, and see if another model can be trained to recognize which activations came from which dataset. These feature representations are non-sensitive, and are thus not encrypted. The profile and the encrypted data assets are then output to the core management system (at 1340) and are distributed to one or more sequestered capsule computing enclaves (at 1350). At the sequestered capsule computing node, the training assets are decrypted and validated (at 1360). After validation the training assets from more than one data steward node are combined into a single featured training model (at 1370). This is known as federated training.

Figure 14:
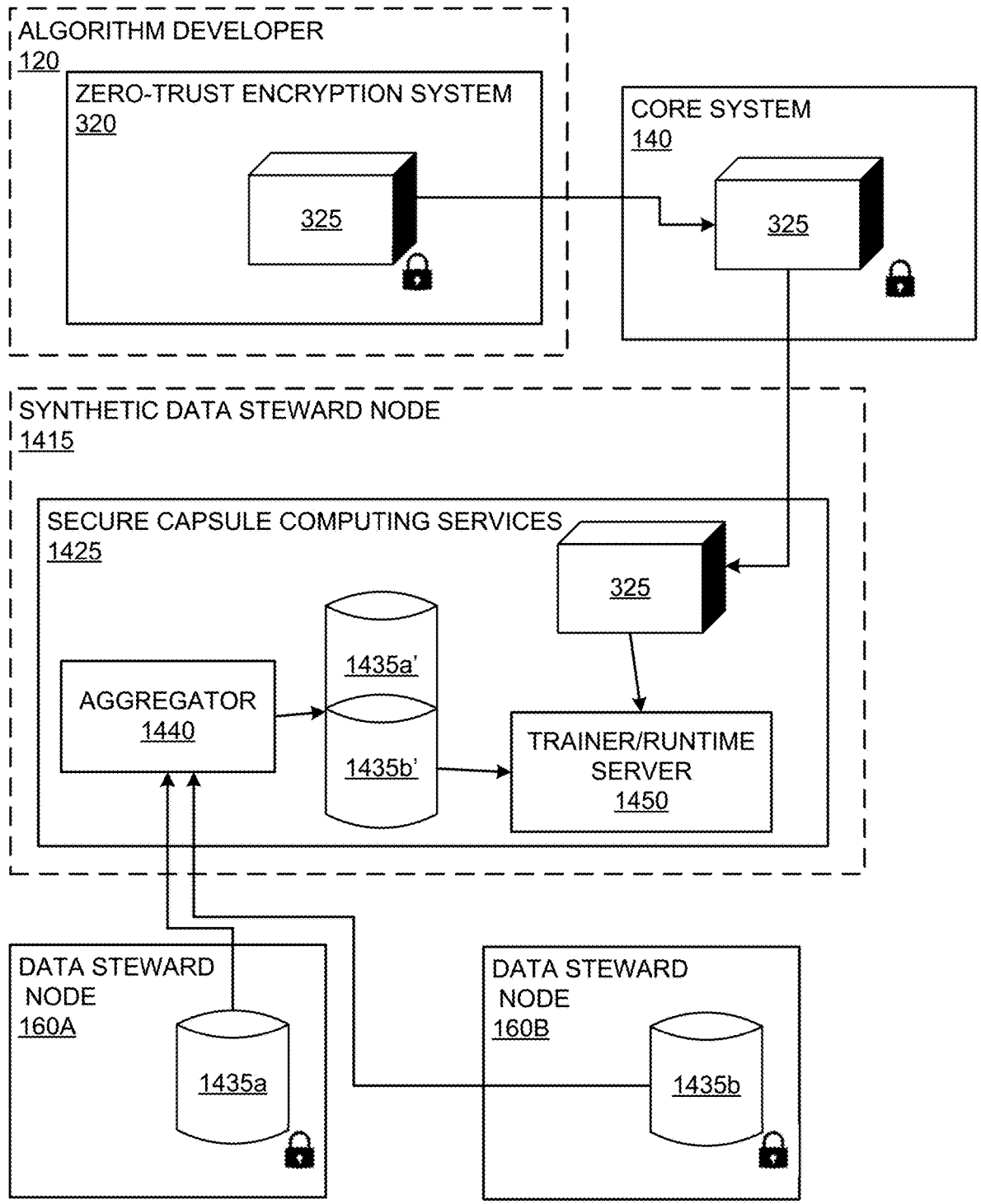
FIG. 14 is an example block diagram showing the aggregation of datasets for exfiltration prevention and reduction of overfitting, in accordance with some embodiments.

Turning now to FIG. 14 which provides a block diagram for the system for creation of a "synthetic data steward" with the ability to combine data from different sources longitudinally (e.g., a single record in the computation by the algorithm being constructed from data originating from multiple data sources) as a final data set. Unlike other systems disclosed already, this example system relaxes the constraint that the sensitive data 1435*a-b* never leaves the infrastructure of a given data steward 160A-B. However, all other security constraints remain intact. This includes the fact that the sensitive data 1435*a-b* is never 'seen' by any counterparty, that the algorithm 325 is never 'seen' by any other counterparty, and that the sensitive data 1435*a-b* does not need to be de-identified or otherwise modified before computations are performed on it. By 'seen' it means that any of the underlying data/code is available to the party in-the-clear as opposed to in an encrypted state.

In this example system, the algorithm developer 120 generates an algorithm 325 which is then encrypted and shared with the core management system 140. This package remains encrypted and is provided to the synthetic data steward node 1415. Each data steward node 160A-B contributes a different portion of the sensitive data required by the algorithm developer's 120 data specification. This specification outlines the kinds/quality/amount of data required for the algorithm 325 to operate successfully. The union of the data from the various data stewards 160A-B satisfies this specification requirement, thereby allowing the algorithm 325 to successfully operate on the amalgamated data set (seen as the conjoined 1435*a* and 1435*b* dataset within the sequestered computing service 1425) located in the synthetic data steward node 1415. It should be noted that two data stewards 160A and 160B are illustrated in this example figure. In reality, any number of data stewards 160A-B may be providing sensitive data 1435*a-b* to the synthetic data steward node 1415 for generating an amalgamated final data set.

Sensitive data 1435*a-b* that is shared with the synthetic data steward node 1415 may be subject to any manner of transforms in order to get the data into a standardized format prior to operation with the algorithm 325. A secure computing enclave known as the sequestered computing service 1425 operating within the synthetic data steward node 1415 is able to decrypt the algorithm 325, and the individual data sets 1435*a-b*, and allows the operation of the algorithm 325 on this amalgamated final data set to generate a consolidated output. An aggregator 1440 may be employed to collate the individual data sets 1435 *a-b*, transform them as necessary, and combine them into the final conjoined super-set 1435*a'-b'*. This output may then be encrypted, when desired, and shared with any number of stakeholders. These stakeholders may include the algorithm developer 120, the data steward(s) 160A-B, regulatory bodies, researchers, and the like.

The aggregator 1440 assembles/combines the data from the multiple data steward nodes 160A-B using any number of matching methodologies. In some embodiments when one or more keys can be used to match records from different sources, the matching methodology is to create a single final data set (seen as the consolidated data stack in the sequestered computing service 1425) for all of the keys for which a complete record is available. In some cases, records from one data steward (e.g., data steward 160A) may not be present in another (e.g., data steward 160B). Such records will not be included in the final data set, but statistics about their presence or absence in each source data set may be noted for quality purposes (for example to ensure that record mismatches do not cause bias in the final data set).

In other embodiments, when unique keys are not available, then a record matching algorithm may be employed by the aggregator 1440. For example, depending upon the type of data being computed upon, matching might be performed using demographic data for individuals represented in each record of a healthcare data set, or transaction types and counterparty characteristics might be used for matching related financial transactions in a banking or regulatory application. There is an unlimited number of potential matching methodologies which could be employed by the aggregator 1440. As in the case when keys are available, statistics about the presence or absence of records in each source may be noted. When record matching is required, information about the strength or confidence of the match within each record may also be included in the data to allow different types of inference on the data, depending on how likely a matching error may have occurred.

Data aggregation for training an algorithm has a benefit in reducing the likelihood of an effective inversion attack. Further, larger datasets allow for more robust model training for better performing algorithms. Further, by having a large number of records available for training an algorithm, different permutations of subsets may be generated from the data superset. As noted before, having larger numbers of subsets which are used to train weak models which are then combined into a strongly trained algorithm reduces the risk of model overfitting, and can also reduce the effectiveness of inversion attacks against the final algorithm for the purpose of data exfiltration.

Figure 15:
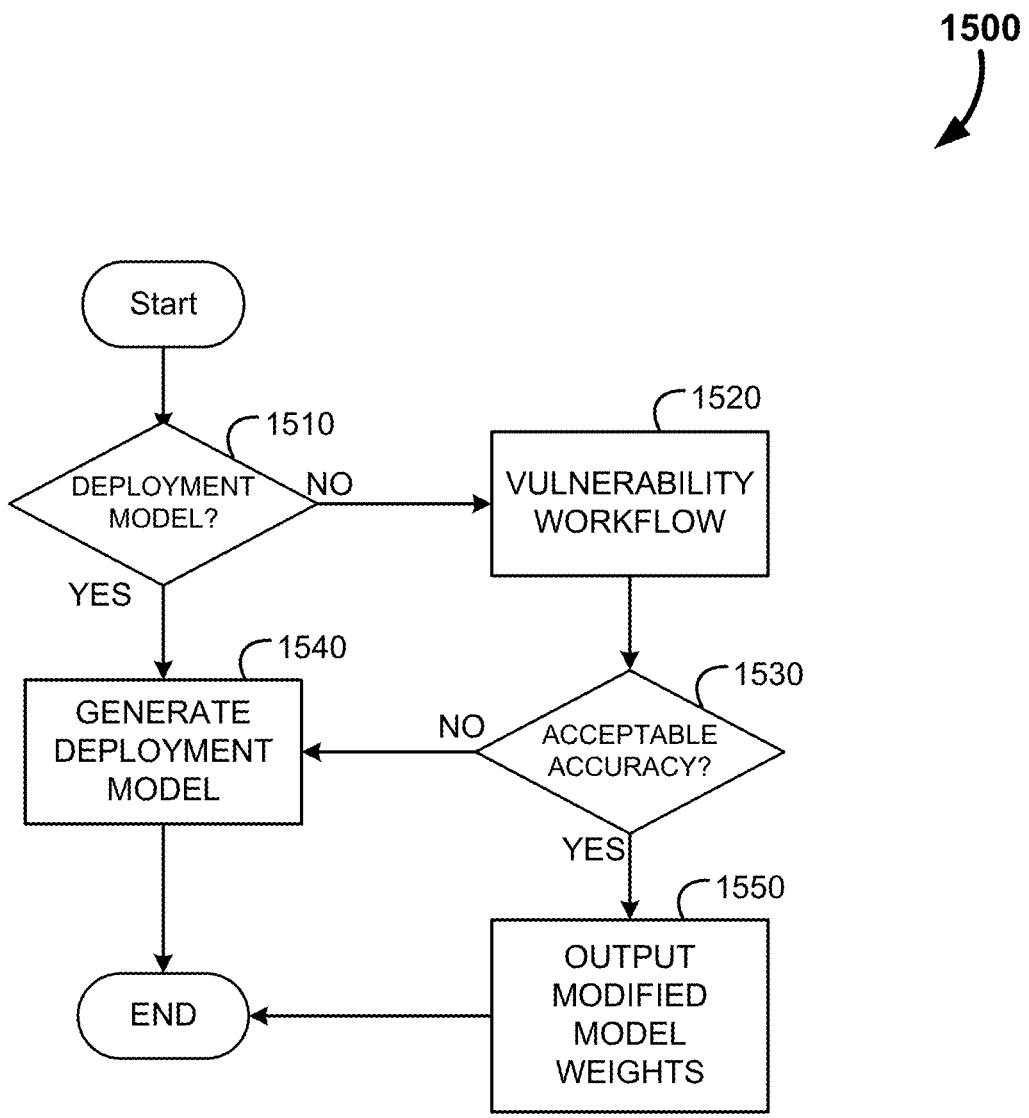
FIG. 15 is a flow diagram for the example process of data exfiltration prevention, in accordance with some embodiments.

Turning now to FIG. 15, an example process for the prevention (or minimization) of data exfiltration through inversion attacks is presented, shown generally at 1500. In this example process, an initial inquiry is made whether a deployment model is acceptable (at 1510). As noted before, a deployment model is an algorithm that generates a single classification and a relative confidence threshold for the classification. In our prior examples seen in FIG. 17 the images were each classified as 'dogs' and with medium to high confidence levels. For many data stewards, such outputs may be entirely acceptable if it means their underlying training data is exempt from exfiltration. However, there may sometimes be situations where more detailed results, including full classification vectors, may be desirable for the data stewards. Generally, the algorithm developers also want access to their trained algorithm weights, thereby preventing a simple deployment model from being utilized. However, if there is no pushback over the usage of a deployment model, it may be generated and utilized (at 1540). As noted, such a deployment model prevents an inversion attack entirely, thereby safeguarding the underlying training data.

However in most situations, whether driven by the algorithm developer, regulator or data steward themselves, a deployment model may not be an acceptable solution. In these situations, a vulnerability workflow for the probability and remediation of data exfiltration, using an inversion attack, is implemented (at 1520).

Figure 16A:
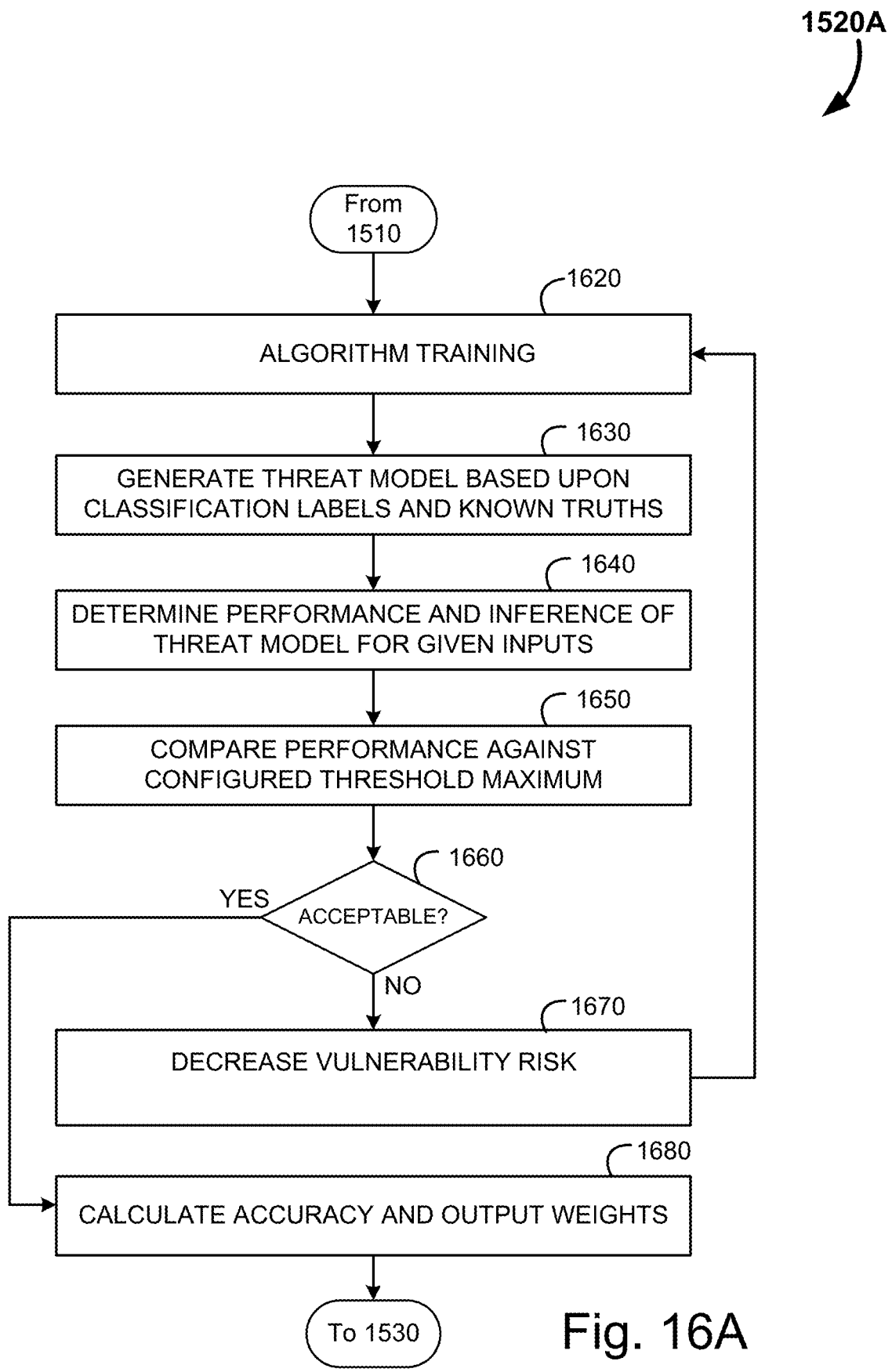
FIGS. 16A-C are flow diagrams for alternate example processes of data exfiltration vulnerability workflows, in accordance with some embodiments.

There are alternative possible vulnerability workflows available. In the first alternative workflow, which is most easily implemented and least computationally resource dependent, a single inversion model is generated for the single algorithm output. In this process, seen generally at 1520 of FIG. 16A, the algorithm is initially trained on a training dataset (at 1620) using simple or federated training techniques. An inversion model is then generated for the algorithm (at 1630). This inversion threat model is generated with the advantage that the actual training dataset is known, and as such the inversion model can ensure that 1) there are no misclassification on whether the input is or is not part of the training set, and 2) that all training inputs are considered during creation and training of the inversion threat model. This results in the threat model (a "gold standard" inversion model) being as accurate as possible; significantly more accurate than an inversion attack performed in situ against the trained algorithm independent from the training set data and knowledge of which data samples were employed in said training. Indeed, traditional inversion attacks require the generation of vast quantities of hypothetical data (real and/or synthetic) to be tested against the trained algorithm. The output classification vectors by the trained algorithm to these inputs is then used by the inversion model to predict if/what of the inputs were part of the original training set. Even with an enormous input set, any inversion attack performed in this manner will be inferior in predicting whether a given input is in the training set as compared against the generated 'gold standard' inversion model where all of the key elements (training data, classification vectors, etc.) are available within the enclave and can be computed upon without human intervention and without sharing any of this data. As such, the generated gold standard threat model sets a ceiling on the probability that any data can be exfiltrated using an inversion attack methodology.

The next step is to test the threat model on various inputs to determine the probability/performance of the threat model (at 1640). This performance may measure the overall likelihood of data exfiltration, or only exfiltration of "sensitive" training data. Often the data steward is not concerned with data exfiltration per se, but rather the exfiltration of the wrong types of data. For example, exfiltrating an individual's temperature, in isolation, is likely of little concern. Exfiltrating their social security number, in contrast, is extremely concerning. However, most models, when exposed to an inversion attack, may have different likelihoods/performances for different types of underlying information. A model detecting the presence of COVID for example, my consume patient identifying information (which is considered extremely sensitive), but an inversion attack may not be able to uncover such data. Temperature data, on the other hand, may be more easily discoverable using an inversion attack. However, if the parties do not care that such information is discovered, it may not matter if the algorithm, as a whole, is vulnerable to an inversion attack.

It is also possible to calculate an upper limit of data exfiltration (not illustrated). Either due to algorithm complexity, or inversion model complexity, it may be extremely difficult to generate many inferences/exfiltration events with a given set of resources. Other things which may place an upper limit of the amount of exfiltration via an inversion model could include machinery the algorithm is operating on (e.g., an x-ray machine for example, with a finite computational capability) or access to a sufficient amount of inputs upon which to generate the inversion model. For example, if the algorithm uses chest x-rays to detect lung cancer, a finite number of images can be collected for generating the inversion attack model, and if these images are available, they are likely already genericized or allowed into the public domain. Generation of synthetic chest x-rays at a scale necessary for meaningful data exfiltration is simply impractical.

The performance of the 'gold standard' inversion model is compared against a threshold maximum (at 1650). This threshold may be pre-configured by the data steward, a regulator or some other governing entity. The threshold may instead be configurable based upon the sensitivity of the underlying data (with more sensitive data requiring a lower performance before being acceptable). This comparison may additionally take into account the upper limit on the ability to exfiltrate the data. For example, a system that can only exfiltrate a dozen inferences in a day may be allowed to have a higher performing inversion model as compared to an inversion attack capable of exfiltrating hundreds or thousands of data points a day. A determination is made whether the performance of the inversion model is acceptably low or not (at 1660) in light of the sensitivity of the data, parties involved, limits on inferences than can be made, and any other considerations of relevance. If the inversion model's performance is sufficiently low, the accuracy of the algorithm is calculated (algorithm performance) and is output along with the algorithm's weights.

However, if the inversion attack would be too effective (the inversion model's performance is too high), the noise mixture of the underlying training data may be increased (at 1670). This noise addition may be as simple as adding Gaussian noise or may be more targeted. For example random or pseudo-random noise could be injected into only the data parts that are considered 'sensitive', while leaving non-sensitive training data unscathed. Alternatively, the inversion model itself may be used to generate a noise profile designed to most effectively impact any given inversion attack while minimizing the algorithm classification performance/accuracy. It is possible to interrogate machine learning (including deep learning) models to understand which inputs or combinations of inputs are most important to the decision making of the model. These specific inputs or combinations of inputs are most associated with inversion attack vulnerability, which implies that noise added to these inputs will result in the largest reductions in vulnerability. The weighting of the magnitude of the noise inversely to the correlation of each input or combination of inputs to the performance of the attack model provides a methodology to generate a noise profile from the attack model that achieves maximum privacy protection with minimal input on model performance.

After the noise has been added to the training set, the entire process may repeat with the (re)training of the algorithm (at 1620). It should be noted that, however artfully done, the addition of noise to a training set will almost always decrease the algorithm performance, so it is advantageous to add as little noise as possible to achieve the desired level of resistance to an inversion attack. To this end, the process may be iteratively performed whereby only a little noise is added to each cycle until the requisite level of noise is obtained. In other embodiments, the noise addition may be dynamically varied based upon inversion model performance. An extremely well performing inversion model may prompt the system to include a fair amount of noise in the next cycle. If the performance of the inversion model is poor after the injection of the noise, another cycle with slightly less noise may be attempted. This dynamic noise addition may iterate until the "right" noise mixture is achieved.

As noted before, there may be situations where the training set may be sufficiently sized to allow for the subdivision of the training data into subsets. These subsets may then be used to each train a 'weak' algorithm that can then be combined into a single 'strong' algorithm. The advantage of this technique is that is can sometimes reduce the risk of data exfiltration via inversion attack against the final strong algorithm, and doubly it reduces the problem of overfitting. Overfitting refers to the tendency of models with many free parameters to "memorize" data rather than to find patterns that can be generalized. As an illustration, consider a polynomial that is tasked with modeling a dozen data points that trend linearly upward from left to right but which are randomly placed above and below a straight line. It is possible to create a 12-degree polynomial that passes perfectly through all 12 data points, resulting in a modeling error on this training set of zero. There are two challenges with this 12-degree polynomial: First, if you use it to interpolate any x value other than the 12 x values in the training set, the polynomial could take almost any value far above or below the data. This means the "model" has not inferred anything to help it predict the value of the underlying function being modeled for any points other than the original training points. Second, and most important to this discussion, it has literally memorized the training data, so by inputing the x value of any training point, one can recover the exact function value for that point. This means the exact input data can be recovered and can be seen as an inversion attack vulnerability. It is correct to extend this example to models in higher dimensions, so models that have been overfit are more vulnerable to inversion attack.

Figure 16B:
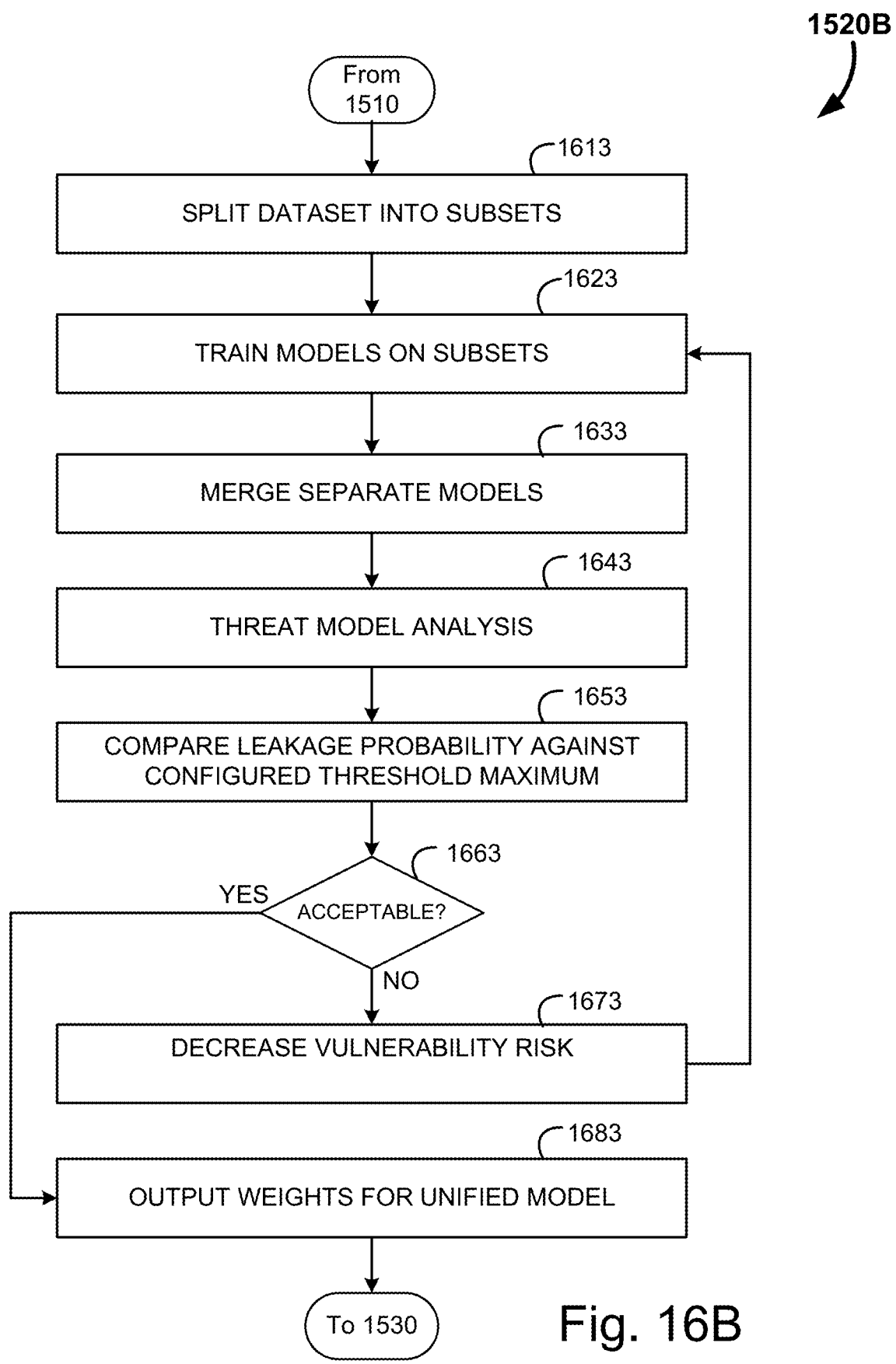

FIG. 16B illustrates a vulnerability workflow that incorporates the concept of training set splitting, as shown generally at 1520B. Initially the data set is sub-divided into subsets (at 1613). This may include dividing the training data into N groups, with each of the N groups containing the same number of data samples. In other embodiments, the number of data points in each group may differ, but the resulting weak algorithm generated by training from the subgroup should be weighted by the size of its training set when it is being combined into the strong algorithm. This ensures that no single data point is afforded more impact than any other data point in the final model.

In some embodiments, the data set may be sub-divided into first N groups, and the same superset divided into a second subset of M groups. The N and M groups will have some overlap by necessity, but the groupings should be performed such that the N and M groups are generally orthogonal to one another. In some embodiments, the superset may be divided into any number of subgroups. For example, assume the superset includes the numbers between one and ten. The groupings could then include [1,2], [3,4], [5,6], [7,8], [9,10]. Other groupings could include [1,5], [2,4], [3,8], [6,9], [7,10]. In some embodiments, the groupings could include [1,2,4,6,8], [3,5,7,9,10]. In another embodiment, the groupings could include [1,2,6], [3,9,10], [4,5,7,8]. What is important is that each 'weak' algorithm generated off a subset is given as much weight as the data points used to train the given weak algorithm. For example, a model trained on a thousand data points is afforded a tenth of the weight as a model trained on ten thousand data points.

The weak algorithms are each trained upon each individual subset that was generated (at 1623). The separate weak algorithms are then merged (usually through a weighted averaging) into a strong algorithm (at 1633). A threat model is then generated using this strong algorithm and the known training data samples, as similarly discussed previously (at 1643). Limits on the number of inferences that can practically be derived, and the sensitivity of the training data that is exfiltrated can also be performed (not illustrated). The performance of the generated inversion threat model can be characterized (generally for only the sensitive portions of the training data) and compared against a configured maximum allowed performance (at 1653). If the performance is acceptably low (at 1663), the algorithm accuracy/performance may be characterized and output along with the weights (at 1683). However, if the performance of the inversion model is too high, noise may be added to the training data sets (at 1673). Again, noise addition may be randomized, or may be targeted based upon desired operability. This noise may be added to the individual subsets, or may be added to the training superset, which may then re-undergo the sub-division into new training data subsets. As with the prior vulnerability workflow, here the process may iteratively continue until an inversion attack is found to be below an acceptable threshold of efficacy.

Figure 16C:
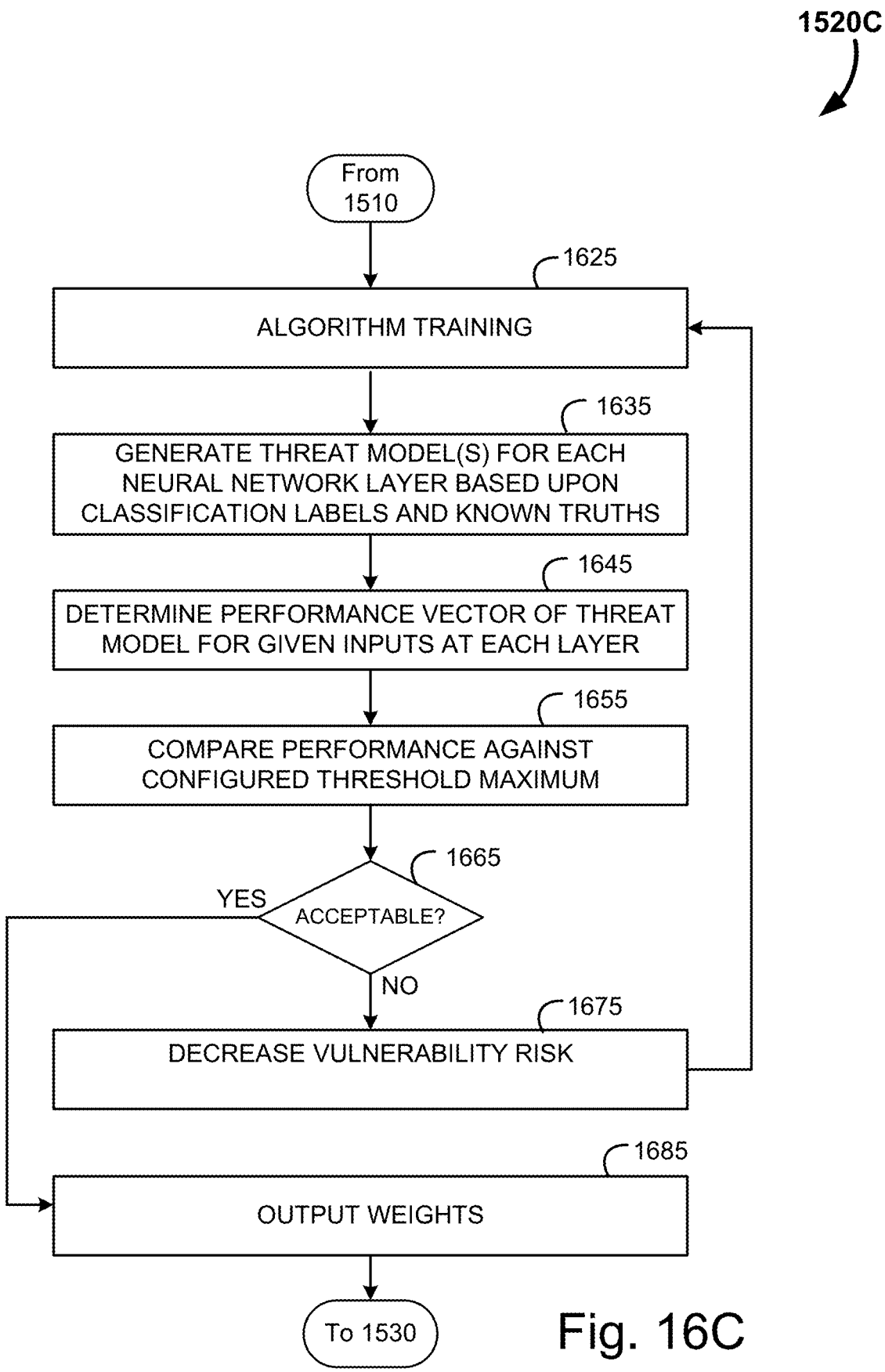

While the above disclosed processes may be sufficient for most inversion attack prevention, there are situations where the bad actor may have more advanced access to the algorithm which is a multi-layered neural network type of algorithm. This may occur where the algorithm code has been open sourced, or when the algorithm developer itself is the bad actor, for example. In these situations, the inversion attack may not only be possible for the algorithm outputs, but could be more accurately tuned by looking at each layer in the algorithm neural network. The vulnerability workflow for such a situation is primarily consistent to that looking at only the single algorithm output, which some small variations as may be seen generally at 1520C of FIG. 16C. Here, as before, the neural network is first trained (at 1625). Rather than next generating a single inversion threat model for the algorithm, however, multiple threat models may instead be generated. Each inversion model may be generated (at 1635) for different layers of the neural network of the algorithm. These inversion models use the algorithm's given neural network's output, as well as the known state of the training data to be precisely tuned. The performance of each of these threat models may be calculated (at 1645) individually, or as an amalgamation of these threat models. The performances are then compared against the configured performance threshold (at 1655). When the inversion models performance is below the threshold (which may be influenced by the sensitivity of the data and practical upper limit for inferences made in a given time period for a given set of computational resources) the weights and the performance of the algorithm may be output (at 1685). Otherwise, the risk of data exfiltration may be considered too large, and the noise mixture in the training data may be increased (at 1675) are previously discussed.

Returning to FIG. 15, after any given vulnerability workflow 1520, a determination is made on whether the algorithm performance, having undergone this conditioning cycle that increases the training data noise until it is resistant to an inversion attack, is of sufficient quality (at 1530). Again, the increase in noise mixture in the training data is beneficial in thwarting inversion attacks, but this comes at a cost. The cost is a generally lower performing algorithm. After multiple iterations of modulating the noise mixture for the algorithm training, it is possible the final end product simply does not perform sufficiently well. In this case, the only option is to revert to a version of the model whose accuracy is acceptable, but which can be compromised by an inversion attack. This model cannot be released however, as it allows for exfiltration of the training material, and as such it is repackaged as an executable deployment model (at 1540). Again, the deployment model can be used to generate a single classification and a relative confidence level. It does not output a classification vector or any data in such sufficient granularity to enable an inversion attack.

If however, the performance of the modified, inversion-attack-resistant algorithm is still sufficiently high, the model weights for this trained algorithm may be provided back to the algorithm developer (at 1550) for deployment on other data sets.

Figure 19A:
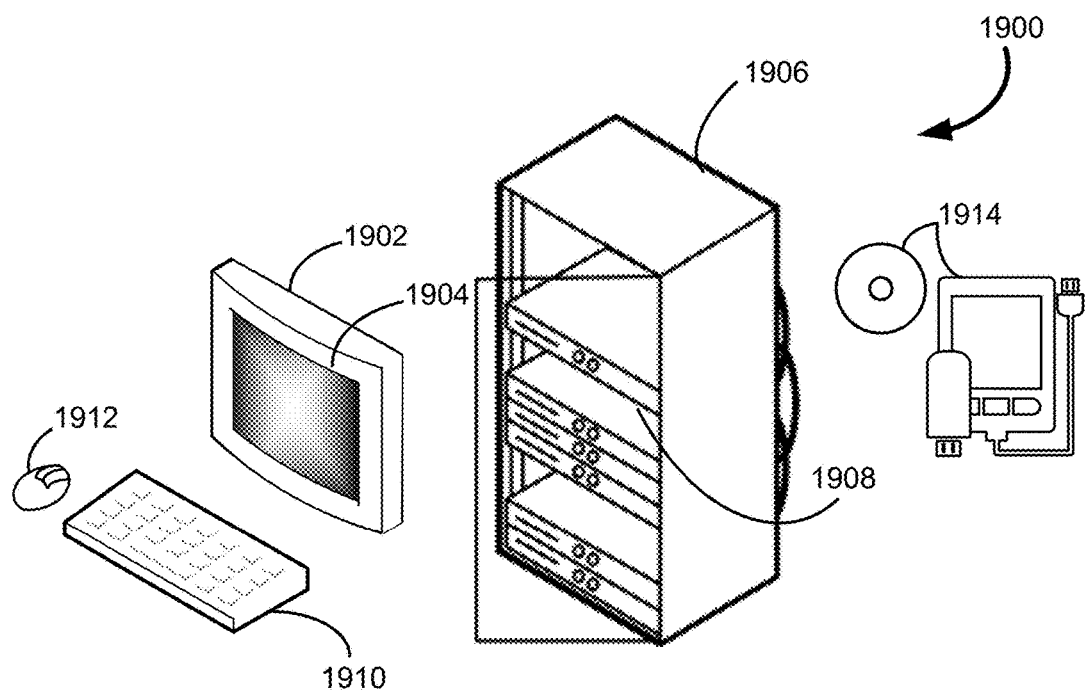
FIGS. 19A and 19B are illustrations of computer systems capable of implementing the zero-trust computing, in accordance with some embodiments.
Figure 19B:
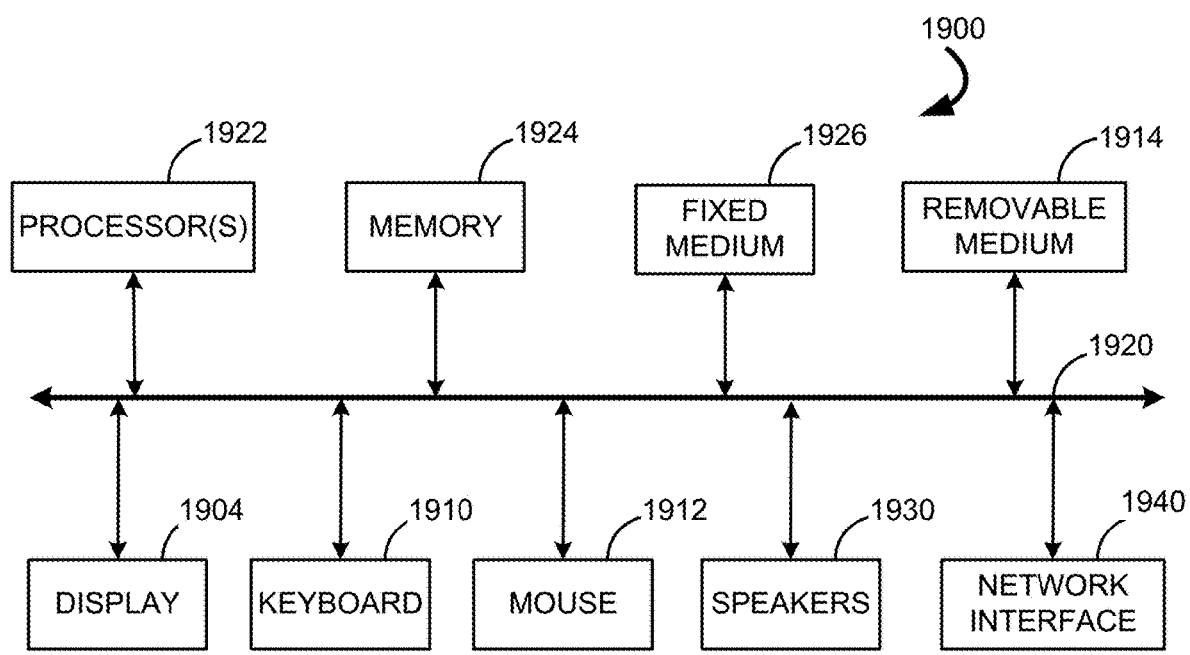

Now that the systems and methods for zero-trust computing have been provided, attention shall now be focused upon apparatuses capable of executing the above functions in real-time. To facilitate this discussion, FIGS. 19A and 19B illustrate a Computer System 1900, which is suitable for implementing embodiments of the present invention. FIG. 19A shows one possible physical form of the Computer System 1900. Of course, the Computer System 1900 may have many physical forms ranging from a printed circuit board, an integrated circuit, and a small handheld device up to a huge supercomputer. Computer system 1900 may include a Monitor 1902, a Display 1904, a Housing 1906, server blades including one or more storage Drives 1908, a Keyboard 1910, and a Mouse 1912. Medium 1914 is a computer-readable medium used to transfer data to and from Computer System 1900.

FIG. 19B is an example of a block diagram for Computer System 1900. Attached to System Bus 1920 are a wide variety of subsystems. Processor(s) 1922 (also referred to as central processing units, or CPUs) are coupled to storage devices, including Memory 1924. Memory 1924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 1926 may also be coupled bi-directionally to the Processor 1922; it provides additional data storage capacity and may also include any of the computer-readable media described below. Fixed Medium 1926 may be used to store programs, data, and the like and is typically a secondary storage medium (such as a hard disk) that is slower than primary storage. It will be appreciated that the information retained within Fixed Medium 1926 may, in appropriate cases, be incorporated in standard fashion as virtual memory in Memory 1924. Removable Medium 1914 may take the form of any of the computer-readable media described below.

Processor 1922 is also coupled to a variety of input/output devices, such as Display 1904, Keyboard 1910, Mouse 1912 and Speakers 1930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1922 optionally may be coupled to another computer or telecommunications network using Network Interface 1940. With such a Network Interface 1940, it is contemplated that the Processor 1922 might receive information from the network, or might output information to the network in the course of performing the above-described zero-trust analysis and retardation of data exfiltration. Furthermore, method embodiments of the present invention may execute solely upon Processor 1922 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1900 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for model dissemination with data exfiltration prevention in a zero trust environment, the method comprising:

iteratively modifying a noise mixture in a data set used to train an algorithm responsive to an inversion model until performance of the inversion model is below a performance threshold;

characterizing the performance of the algorithm for the data set with the iteratively modified noise mixture;

determining if the performance of the algorithm is at or above a second threshold, then outputting weights for the algorithm;

determining if the performance of the algorithm is below the second threshold, then reverting the algorithm to being trained on the data set without any noise mixture and generating a deployment model; and wherein the noise mixture is generated by:

interrogating the inversion model to generate inputs or combinations of inputs are most important to the decision making of the inversion model;

generating noise for the inversion model; and weighting of the magnitude of the noise inversely to the correlation of each of the input or combination of inputs to the performance of the inversion model.

2. The method of claim 1, wherein the deployment model outputs a single classification and a relative confidence level.

3. The method of claim 1, wherein the performance threshold is configured based upon at least one of a sensitivity level of the data set and an upper limit on data inferences.

4. The method of claim 3, wherein the upper limit on data inferences is defined based upon computational resources, time and input data availability.

5. The method of claim 1, wherein the noise mixture is generated by:

interrogating the inversion model to generate inputs or combinations of inputs are most important to the decision making of the inversion model;

generating noise for the inversion model; and weighting of the magnitude of the noise inversely to the correlation of each of the input or combination of inputs to the performance of the inversion model.

6. The method of claim 5, wherein the noise mixture applies the weighted noise to the training set for the inputs or combination of inputs.

7. A zero-trust computerized system for model dissemination with data exfiltration prevention, the zero trust computerized system comprising:

a threat vulnerability server for iteratively modifying a noise mixture in a data set used to train an algorithm responsive to an inversion model until performance of the inversion model is below a performance threshold, characterizing the performance of the algorithm for the data set with the iteratively modified noise mixture, and when the performance of the algorithm is at or above a second threshold, outputting weights for the algorithm, otherwise when the performance of the algorithm is below the second threshold, reverting the algorithm to being trained on the data set without any noise mixture and generating a deployment model; and wherein the noise mixture is generated by:

interrogating the inversion model to generate inputs or combinations of inputs are most important to the decision making of the inversion model;

generating noise for the inversion model; and weighting of the magnitude of the noise inversely to the correlation of each of the input or combination of inputs to the performance of the inversion model.

8. The zero-trust computerized system of claim 7, wherein the deployment model outputs a single classification and a relative confidence level.

9. The zero-trust computerized system of claim 7, wherein the performance threshold is configured based upon at least one of a sensitivity level of the data set and an upper limit on data inferences.

10. The zero-trust computerized system of claim 9, wherein the upper limit on data inferences is defined based upon computational resources, time and input data availability.

11. The zero-trust computerized system of claim 7, wherein the noise mixture is generated by:

interrogating the inversion model to generate inputs or combinations of inputs are most important to the decision making of the inversion model;

generating noise for the inversion model; and weighting of the magnitude of the noise inversely to the correlation of each of the input or combination of inputs to the performance of the inversion model.

12. The zero-trust computerized system of claim 11, wherein the noise mixture applies the weighted noise to the training set for the inputs or combination of inputs.

13. A non-volatile computer program product which when executed on a computer system in a zero-trust environment performs the steps of:

iteratively modifying a noise mixture in a data set used to train an algorithm responsive to an inversion model until performance of the inversion model is below a performance threshold;

characterizing the performance of the algorithm for the data set with the iteratively modified noise mixture;

determining if the performance of the algorithm is at or above a second threshold, then outputting weights for the algorithm;

determining if the performance of the algorithm is below the second threshold, then reverting the algorithm to being trained on the data set without any noise mixture and generating a deployment model; and wherein the noise mixture is generated by:

interrogating the inversion model to generate inputs or combinations of inputs are most important to the decision making of the inversion model;

generating noise for the inversion model; and weighting of the magnitude of the noise inversely to the correlation of each of the input or combination of inputs to the performance of the inversion model.

14. The non-volatile computer program product of claim 13, wherein the deployment model outputs a single classification and a relative confidence level.

15. The non-volatile computer program product of claim 13, wherein the performance threshold is configured based upon at least one of a sensitivity level of the data set and an upper limit on data inferences.

16. The non-volatile computer program product of claim 15, wherein the upper limit on data inferences is defined based upon computational resources, time and input data availability.

17. The non-volatile computer program product of claim 13, wherein the noise mixture is generated by:

interrogating the inversion model to generate inputs or combinations of inputs are most important to the decision making of the inversion model;

generating noise for the inversion model; and weighting of the magnitude of the noise inversely to the correlation of each of the input or combination of inputs to the performance of the inversion model.

18. The non-volatile computer program product of claim 17, wherein the noise mixture applies the weighted noise to the training set for the inputs or combination of inputs.

* * * * *